US010600169B2

(12) United States Patent
Yamasaki et al.

(10) Patent No.: US 10,600,169 B2
(45) Date of Patent: Mar. 24, 2020

(54) IMAGE PROCESSING SYSTEM AND IMAGE PROCESSING METHOD

(71) Applicant: SONY CORPORATION, Tokyo (JP)

(72) Inventors: Rio Yamasaki, Tokyo (JP); Takaaki Nakagawa, Kanagawa (JP); Hideo Okamoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 3 days.

(21) Appl. No.: 15/559,421

(22) PCT Filed: Mar. 15, 2016

(86) PCT No.: PCT/JP2016/058065
§ 371 (c)(1),
(2) Date: Sep. 18, 2017

(87) PCT Pub. No.: WO2016/152633
PCT Pub. Date: Sep. 29, 2016

(65) Prior Publication Data
US 2018/0075590 A1 Mar. 15, 2018

(30) Foreign Application Priority Data

Mar. 26, 2015 (JP) ................................. 2015-064806

(51) Int. Cl.
*G06T 5/50* (2006.01)
*H04N 5/91* (2006.01)
(Continued)

(52) U.S. Cl.
CPC ............... *G06T 5/50* (2013.01); *G01B 11/14* (2013.01); *G06T 7/11* (2017.01); *G06T 7/194* (2017.01);
(Continued)

(58) Field of Classification Search
CPC ... G06T 5/50; G06T 7/194; G06T 7/11; G06T 2207/20221; G06T 2207/10016;
(Continued)

(56) References Cited

U.S. PATENT DOCUMENTS 8,041,189 B2 * 10/2011 Shinkai ............... G11B 27/034
386/281
2012/0027297 A1 * 2/2012 Feris .................... G06K 9/34
382/173
(Continued)

FOREIGN PATENT DOCUMENTS

JP 10-260808 A 9/1998
JP 2000-197030 A 7/2000
(Continued)

OTHER PUBLICATIONS

International Search Report and Written Opinion of PCT Application No. PCT/JP2016/058065, dated May 24, 2016, 12 pages of ISRWO.

*Primary Examiner* — John W Lee
(74) *Attorney, Agent, or Firm* — Chip Law Group

(57) ABSTRACT

Provided is an image processing system including at least one information processing apparatus and a distribution server. The information processing apparatus includes a clipping unit that performs image processing of clipping a predetermined object from a moving image in which the object is imaged and generates a clipped moving image of the object, and an operation content acquisition unit that obtains operation content of operation performed on the clipped moving image of the object. The distribution server includes an image processing unit that performs, individually for each of the objects, image processing that corresponds to operation content on a clipped moving image of a plurality of objects, and a combining unit that generates a combined moving image in which the plurality of objects is
(Continued)

arranged by combining the clipped moving images of the plurality of objects that has undergone image processing.

11 Claims, 20 Drawing Sheets

(51) Int. Cl.

| | |
|---|---|
| *H04N 5/765* | (2006.01) |
| *H04N 7/15* | (2006.01) |
| *G11B 27/28* | (2006.01) |
| *G11B 27/10* | (2006.01) |
| *H04N 5/262* | (2006.01) |
| *G11B 27/036* | (2006.01) |
| *G11B 27/34* | (2006.01) |
| *G11B 27/031* | (2006.01) |
| *H04N 5/232* | (2006.01) |
| *G06T 7/194* | (2017.01) |
| *H04N 5/272* | (2006.01) |
| *G06T 7/11* | (2017.01) |
| *G01B 11/14* | (2006.01) |
| *G06T 11/60* | (2006.01) |
| *H04N 5/77* | (2006.01) |

(52) U.S. Cl.
CPC .......... *G11B 27/031* (2013.01); *G11B 27/036* (2013.01); *G11B 27/10* (2013.01); *G11B 27/28* (2013.01); *G11B 27/34* (2013.01); *H04N 5/23216* (2013.01); *H04N 5/23219* (2013.01); *H04N 5/2628* (2013.01); *H04N 5/272* (2013.01); *H04N 5/765* (2013.01); *H04N 5/91* (2013.01); *H04N 7/15* (2013.01); *G06T 11/60* (2013.01); *G06T 2207/10016* (2013.01); *G06T 2207/20221* (2013.01); *G06T 2207/30196* (2013.01); *H04N 5/772* (2013.01)

(58) Field of Classification Search
CPC .. G06T 11/60; H04N 5/2628; H04N 5/23219; H04N 5/23216; H04N 5/272; H04N 5/765; H04N 7/15; H04N 5/91; H04N 5/772; G11B 27/34; G11B 27/28; G11B 27/10; G11B 27/036; G11B 27/031; G01B 11/14

See application file for complete search history.

(56) References Cited

U.S. PATENT DOCUMENTS

| | | | | |
|---|---|---|---|---|
| 2012/0105657 | A1* | 5/2012 | Yokohata | ............. H04N 5/2257 348/208.4 |
| 2015/0035824 | A1* | 2/2015 | Takahashi | ............. H04N 13/271 345/419 |

FOREIGN PATENT DOCUMENTS

| | | |
|---|---|---|
| JP | 2004-128614 A | 4/2004 |
| JP | 2005-094696 A | 4/2005 |
| JP | 2005-94696 A | 4/2005 |
| JP | 2005-191964 A | 7/2005 |
| JP | 2014-238731 A | 12/2014 |

* cited by examiner

FIG. 7
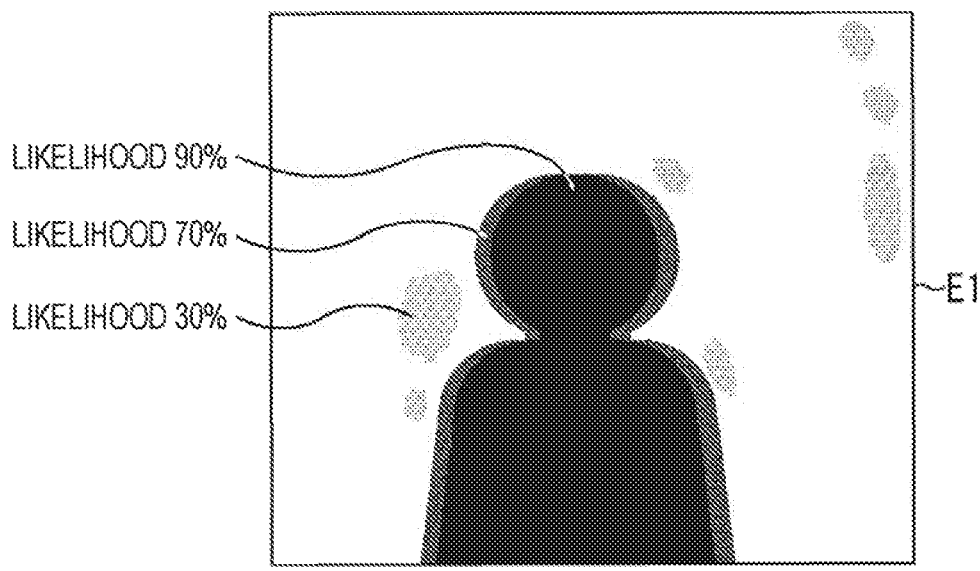
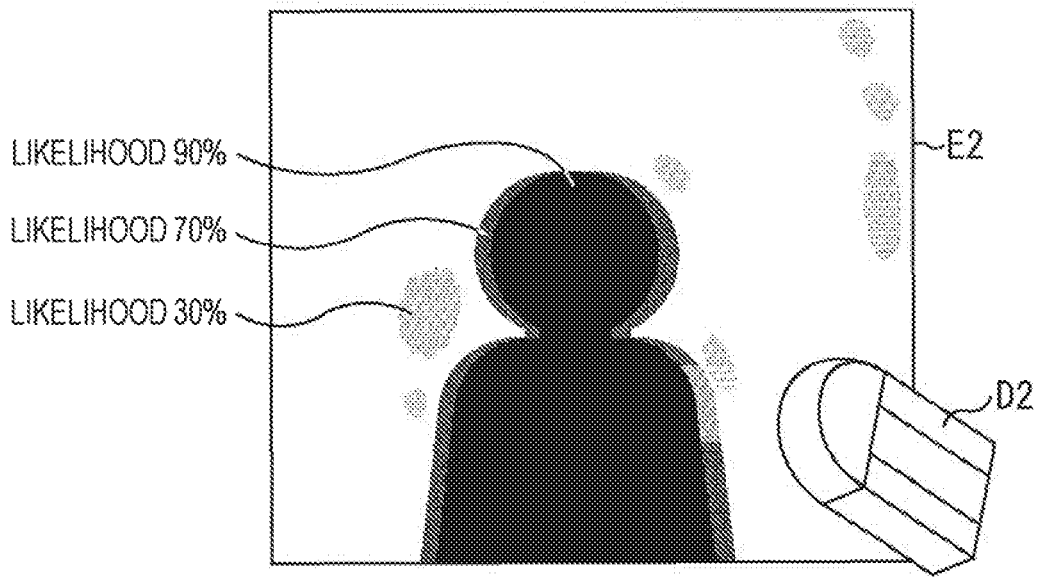

FIG. 8
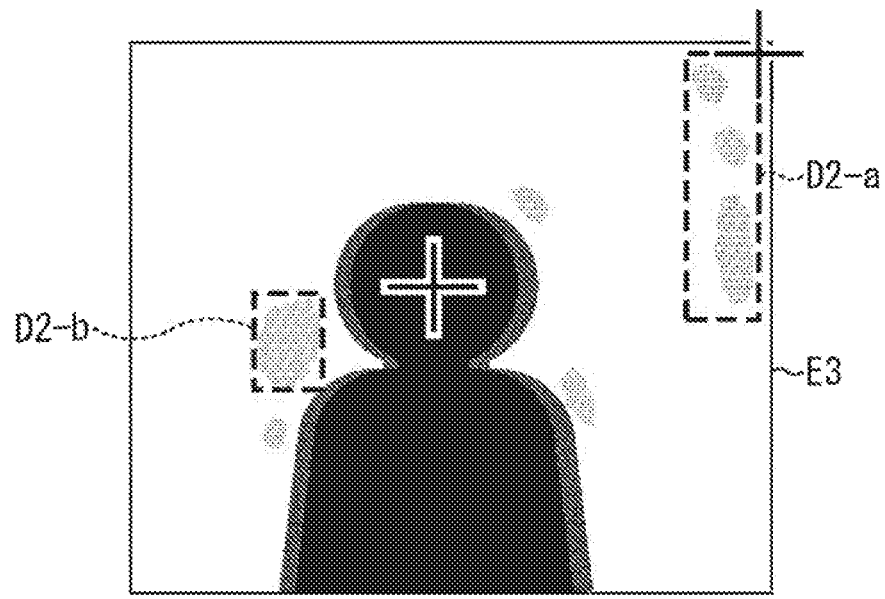
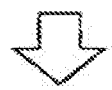
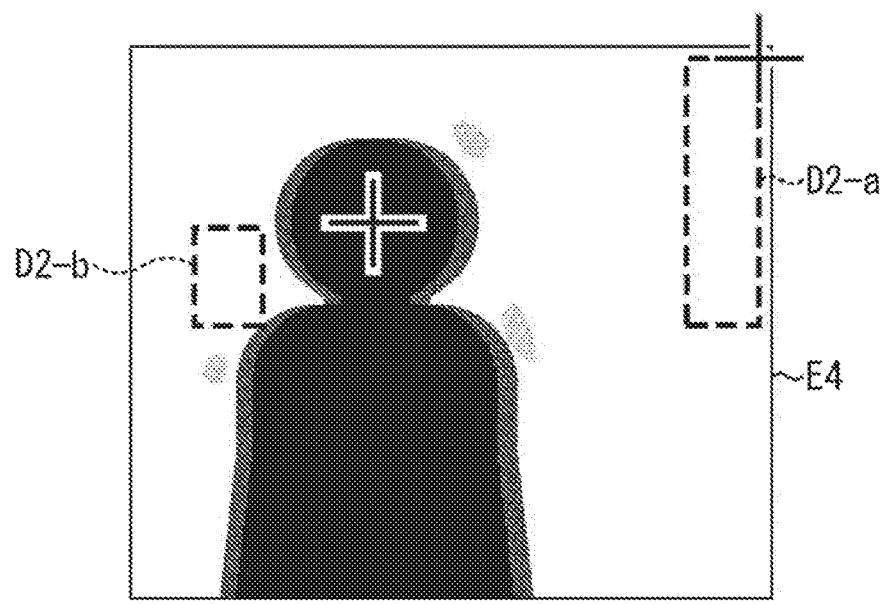

FIG. 13

| OPERATION ID | TARGET USER ID | TYPE INFORMATION | REFERENCE POSITION INFORMATION | TRANSFORM FLAG | REMAINING TIME INFORMATION | TRANSFORMATION PARAMETER |
|---|---|---|---|---|---|---|
| 1 | 0 | DELETION | FACE CENTER | N | INFINITY | POSITIONAL RELATIONSHIP WITH RESPECT TO RELATIVE CENTER, INTENSITY |
| 2 | 0 | DELETION | UPPER RIGHT | N | INFINITY | POSITIONAL RELATIONSHIP WITH RESPECT TO RELATIVE CENTER, INTENSITY |
| 3 | 1 | ENLARGEMENT | — | Y | INFINITY | ENLARGEMENT CENTER AND ENLARGEMENT RATE |
| 4 | 2 | ANIMATION | — | Y | t=25 | ANIMATION ID |
| 5 | 1 | TRIMMING | FACE CENTER | N | INFINITY | RELATIVE POSITION FROM CENTER, RELATIVE SIZE |
| ... | ... | ... | ... | ... | ... | ... |

IMAGE PROCESSING SYSTEM AND IMAGE PROCESSING METHOD

CROSS REFERENCE TO RELATED APPLICATIONS

This application is a U.S. National Phase of International Patent Application No. PCT/JP2016/058065 filed on Mar. 15, 2016, which claims priority benefit of Japanese Patent Application No. JP 2015-064806 filed in the Japan Patent Office on Mar. 26, 2015. Each of the above-referenced applications is hereby incorporated herein by reference in its entirety.

TECHNICAL FIELD

The present disclosure relates to an image processing system, an image processing method, and a program, and particularly relates to an image processing system, an image processing method, and a program capable of achieving better communication.

BACKGROUND ART

In recent years, services that provide communication systems using moving images, such as video telephony, video conference, and open live broadcast by a user have been increasing. For example, the communication system includes a use case in which a plurality of users present at remote sites performs joint appearance on a same screen.

As a technique of presenting such joint appearance, there is a mainly used technique of arranging moving images captured by video cameras held at individual remote sites to be positioned adjacent to each other on the same screen. While this technique enables simultaneous viewing of states of the individual users, it is difficult to obtain a realistic feeling or togetherness to indicate that the users are performing distribution by joint appearance, since the screen includes merely individual moving images of the plurality of users positioned adjacent to each other.

In contrast, Patent Document 1 proposes a technology in which the user clips a portion of the user oneself from the captured moving image using a parallax camera and arranges the portion in a same space shared by a joint user. Moreover, Patent Document 2 proposes a technology in which a user operates the size and movement of a virtual object including the user oneself by using gesture on a television device.

CITATION LIST

Patent Document

Patent Document 1: Japanese Patent Application Laid-Open No. 2014-238731
Patent Document 2: Japanese Patent Application Laid-Open No. 2000-197030

SUMMARY OF THE INVENTION

Problems to be Solved by the Invention

Meanwhile, with the technology proposed in Patent Document 1 described above, it is merely possible to display a clipped user portion at a predetermined position such as "next to the other user" and it is difficult for the user to operate freely in determining the method of display. Moreover, according to the technology proposed in Patent Document 2 described above, for example, it is difficult to perform corresponding operation in a case where a clipped region of the user oneself is excessively larger than the user-intended size, making it difficult to appropriately clip the portion of the user oneself.

In this manner, the conventional technology may have difficulty in appropriately reflecting user's operation in the communication system, leading to a difficulty in achieving better communication.

The present disclosure has been made in view of this situation, and a purpose of the present disclosure is to achieve better communication.

Solutions to Problems

An image processing system according to an aspect of the present disclosure includes an image processing unit configured to perform, individually for each of objects, image processing on an object moving image generated from a moving image in which a predetermined object is imaged and generated so as to include a region in which the object is photographed, the image processing corresponding to operation content applied to the object moving image, and a combined image generation processing unit configured to generate a combined moving image including at least one of the objects by combining the object moving image that has undergone image processing with another moving image.

An image processing method or a program according to an aspect of the present disclosure includes the steps of performing, individually for each of objects, image processing on an object moving image generated from a moving image in which a predetermined object is imaged and generated so as to include a region in which the object is photographed, the image processing corresponding to operation content applied to the object moving image, and generating a combined moving image including at least one of the objects by combining the object moving image that has undergone image processing with another moving image.

According to an aspect of the present disclosure, image processing is performed individually for each of objects, the image processing corresponding to operation content applied to an object moving image, on the object moving image generated from a moving image in which a predetermined object is imaged and generated so as to include a region in which the object is photographed, and a combined moving image in which at least one object is arranged is generated by combining a plurality of the object moving images that has undergone image processing with another moving image.

Effects of the Invention

According to one aspect of the present disclosure, it is possible to achieve better communication.

BRIEF DESCRIPTION OF DRAWINGS

FIG. 7 is a diagram for describing image processing based on likelihood information.

FIG. 8 is a diagram for describing processing of continuously performing deletion of an unnecessary region.

FIG. 13 is a diagram illustrating a format of operation content.

MODE FOR CARRYING OUT THE INVENTION

Hereinafter, specific embodiments of the present technology will be described in detail with reference to the drawings.

Figure 1:
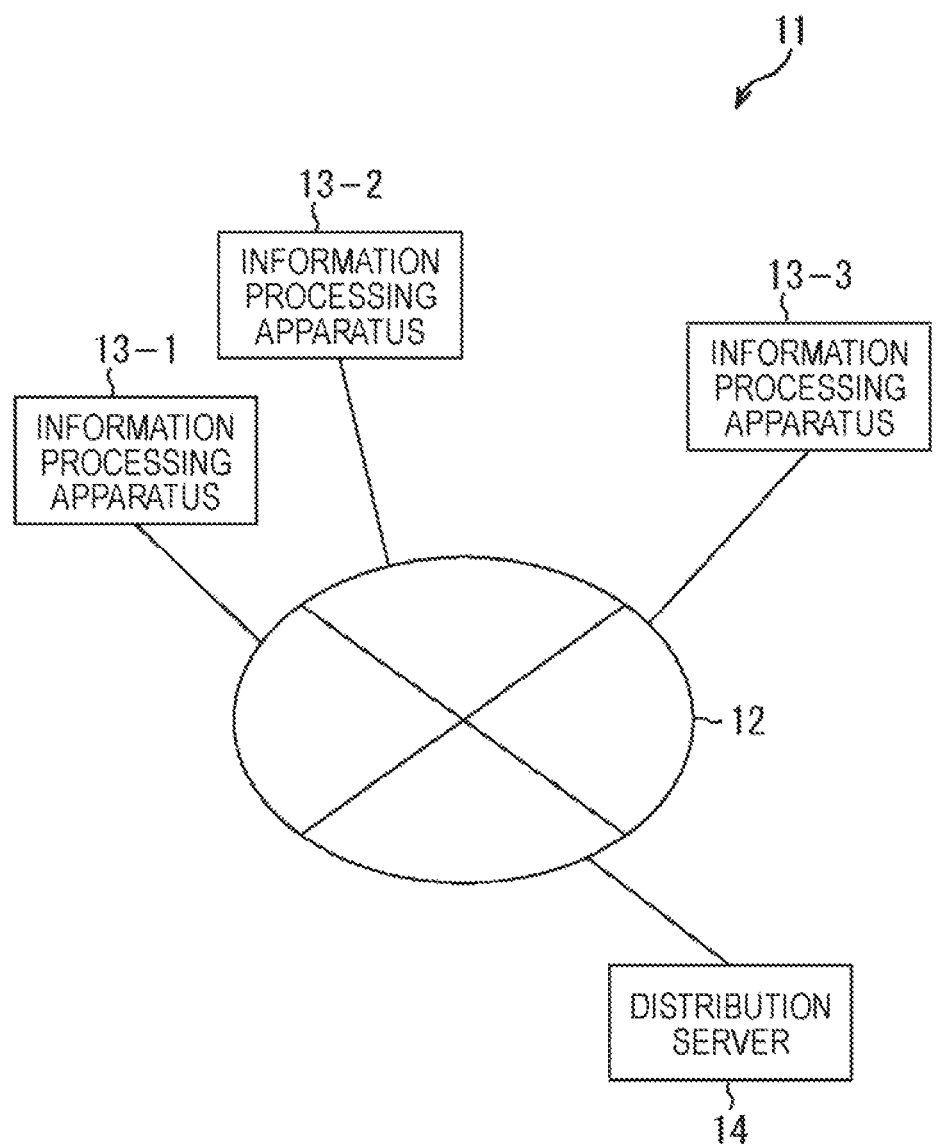
FIG. 1 is a block diagram illustrating an exemplary configuration of a communication system according to an embodiment of the present technology.

FIG. 1 is a block diagram illustrating an exemplary configuration of a communication system according to an embodiment of the present technology.

A communication system 11 in FIG. 1 provides a service for achieving communicating among a plurality of users located at remote sites using an image and enables image processing in the entire system. For example, as illustrated in the figure, the communication system 11 includes a plurality of information processing apparatuses 13 and a distribution server 14 connected via a network 12 such as the Internet. For example, FIG. 1 illustrates an exemplary configuration in which three information processing apparatuses 13-1 to 13-3 are connected with each other via the network 12.

Each of the information processing apparatuses 13-1 to 13-3 is, for example, a camera device with a communication function, and generates a user-clipped moving image by clipping a region in which a user is photographed from a moving image obtained by imaging each of users. Then, each of the information processing apparatuses 13-1 to 13-3 transmits the corresponding generated user-clipped moving image to the distribution server 14 via the network 12. Note that the detailed configuration of the information processing apparatus 13 will be described below with reference to FIG. 3.

The distribution server 14 collects all the user-clipped moving images transmitted from the information processing apparatuses 13-1 to 13-3 via the network 12 and performs image combining processing of superimposing the collected user-clipped moving image on a predetermined background moving image. Then, the distribution server 14 distributes a combined moving image generated by the image combining processing to the information processing apparatuses 13-1 to 13-3 via the network 12. Note that the detailed configuration of the distribution server 14 will be described below with reference to FIG. 4.

For example, the combined moving image distributed in the communication system 11 in FIG. 1 will be described with reference to FIG. 2.

Figure 2:
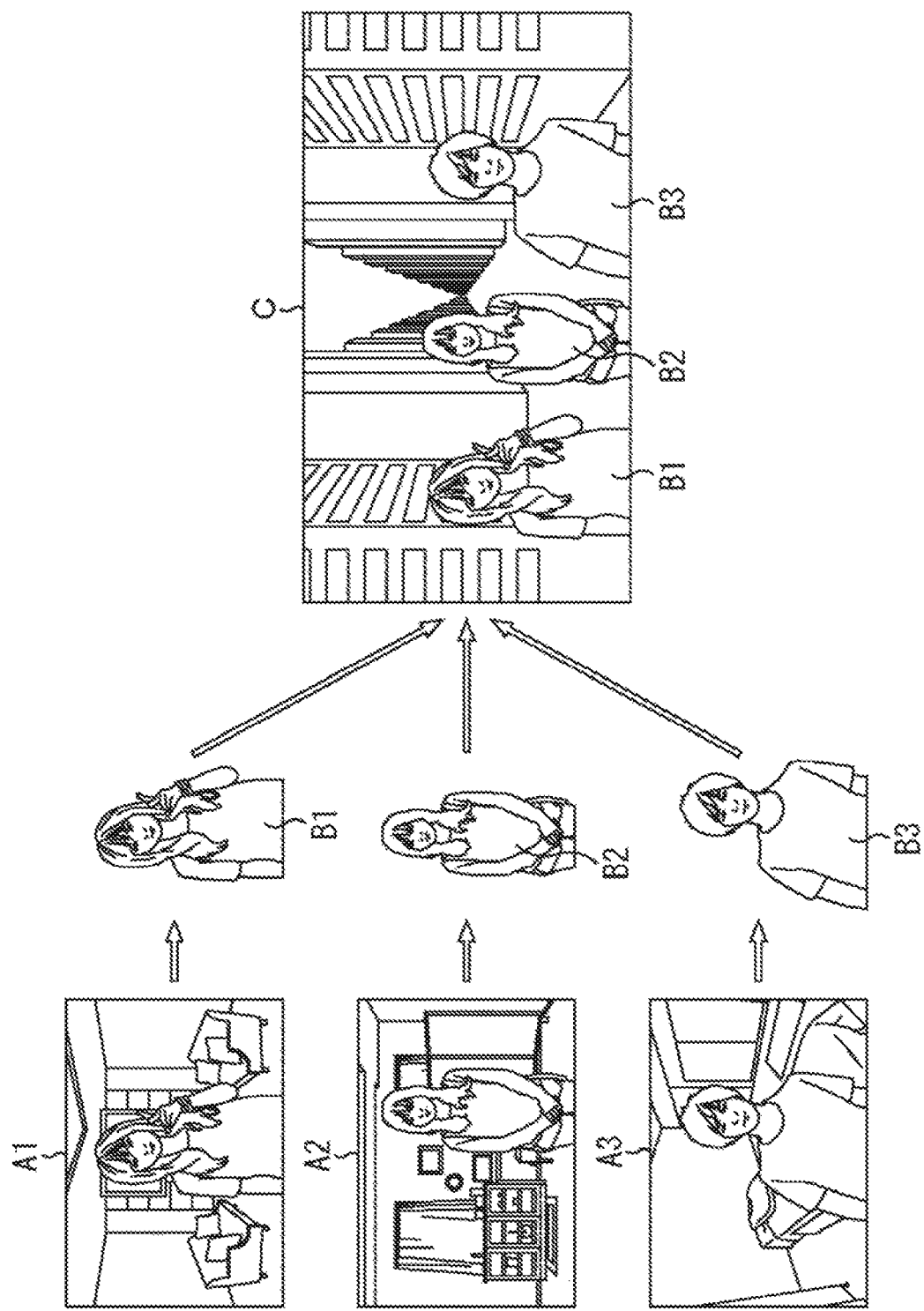
FIG. 2 is a view for describing a combined moving image distributed in a communication system.

A left side portion of FIG. 2 illustrates moving images A1 to A3 as targets of image processing on the information processing apparatuses 13-1 to 13-3, and the right side of the moving images A1 to A3 illustrates user-clipped moving images B1 to B3 obtained by clipping the users photographed in the moving images A1 to A3. The user-clipped moving images B1 to B3 are transmitted to the distribution server 14, and as illustrated on the right side portion of FIG. 2, a combined moving image C obtained by combining the user-clipped moving images B1 to B3 with a predetermined background moving image is generated and distributed from the distribution server 14.

Note that the information processing apparatuses 13-1 to 13-3 each have a similar configuration. Hereinafter, therefore, in a case where there is no need to distinguish between the information processing apparatuses 13-1 to 13-3, they will be simply referred to as the information processing apparatus 13. Moreover, the moving images A1 to A3 and the user-clipped moving images B1 to B3 will also be referred to as the moving image A and the user-clipped moving image B in a similar manner.

Figure 3:
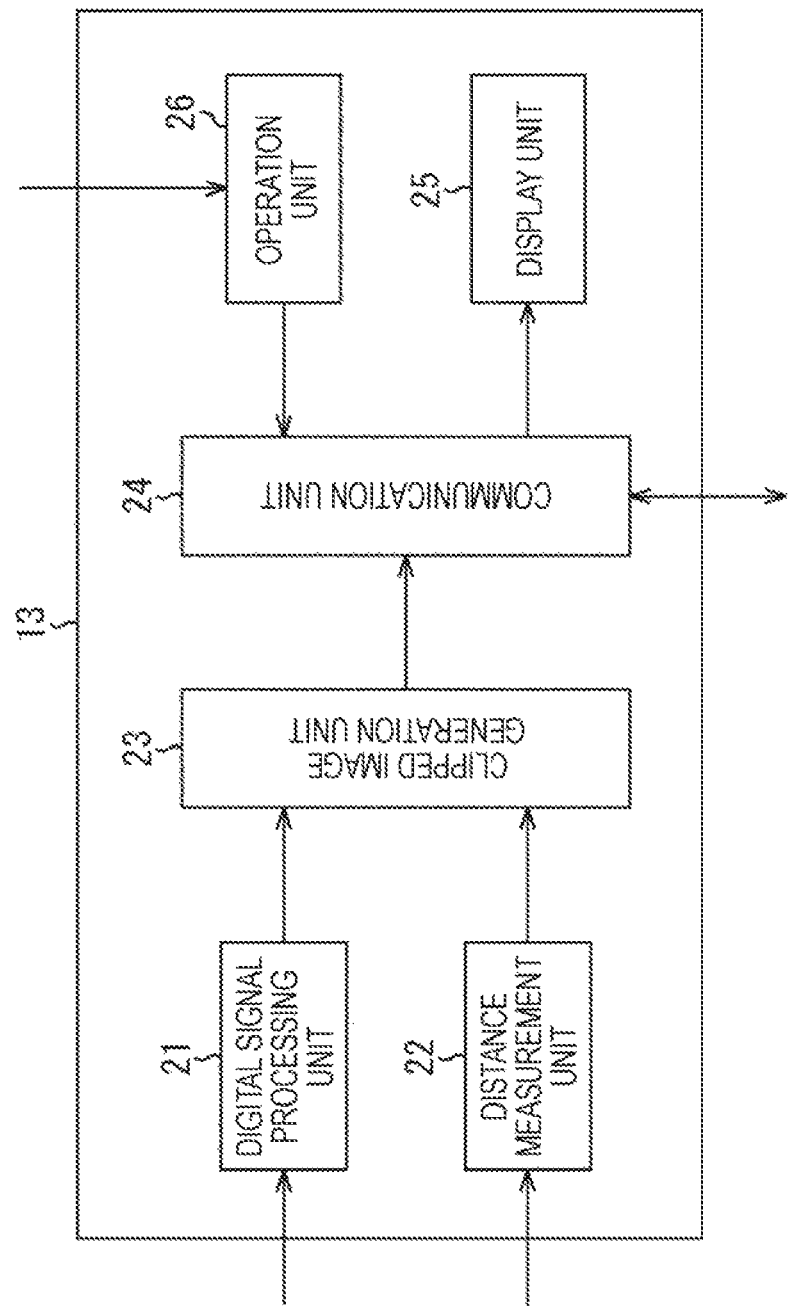
FIG. 3 is a block diagram illustrating an exemplary configuration of an information processing apparatus.

Next, FIG. 3 is a block diagram illustrating an exemplary configuration of the information processing apparatus 13 in FIG. 1.

As illustrated in FIG. 3, the information processing apparatus 13 includes a digital signal processing unit 21, a distance measurement unit 22, a clipped image generation unit 23, a communication unit 24, a display unit 25, and an operation unit 26.

A moving image A (refer to FIG. 2) based on RGB signals captured by an imaging device (not illustrated) is supplied to the digital signal processing unit 21, for example. Then, the digital signal processing unit 21 applies, to the moving image A, digital signal processing needed for performing image processing in the clipped image generation unit 23, whereby, for example, the digital signal processing unit 21 obtains image data for each of frames constituting the moving image A and supplies the image data to the clipped image generation unit 23.

The distance measurement unit 22 measures a distance to an object photographed in the moving image A supplied to the digital signal processing unit 21. For example, a plurality of moving images captured by at least two imaging devices (not illustrated) with a same composition as that of the moving image A is supplied to the distance measurement unit 22. Then, the distance measurement unit 22 calculates a parallax between these moving images, thereby measuring the distance to the object photographed in the moving image A. Then, the distance measurement unit 22 generates a depth map that maps the distance from the imaging device to the object for each of pixels, and supplies the depth map to the clipped image generation unit 23.

On the basis of the depth map supplied from the distance measurement unit 22, the clipped image generation unit 23 performs, on the moving image A supplied from the digital signal processing unit 21, image processing of clipping a target object from the moving image A by masking a target object region in which the target object as a target of clipping is photographed. For example, in a case where the user is photographed as illustrated in FIG. 2, the clipped image generation unit 23 sets the user as the target object on the basis of the depth map and generates a user-clipped moving image B (refer to FIG. 2) in which the user alone is clipped from the moving image A. Then, the clipped image generation unit 23 supplies the generated user-clipped moving image B to the communication unit 24.

The communication unit 24 transmits the user-clipped moving image B supplied from the clipped image generation unit 23 to the distribution server 14 via the network 12. Moreover, if the user performs operation using the operation unit 26, the communication unit 24 adds the operation content to the user-clipped moving image B and transmits the image with the operation content. Furthermore, the communication unit 24 receives the combined moving image C (refer to FIG. 2) distributed from the distribution server 14 and supplies the combined moving image C to the display unit 25.

The display unit 25 includes, for example, a liquid crystal display or an organic electroluminescence (EL) display, and displays the combined moving image C received by the communication unit 24. Moreover, the display unit 25 displays a graphical user interface that displays various types of operation content needed for the user to perform operation on the user-clipped moving image B combined in the combined moving image C by using the operation unit 26.

The operation unit 26 includes a touch panel arranged on a surface of the display unit 25, for example, obtains operation content input by user's operation of touching the user interface displayed on the display unit 25, and supplies the obtained operation content to the communication unit 24.

The information processing apparatus 13 configured as described above is capable of transmitting the user-clipped moving image B to the distribution server 14, and receiving and displaying the combined moving image C distributed from the distribution server 14. Moreover, in a case where the user performs operation, the information processing apparatus 13 is capable of adding the operation content to the user-clipped moving image B, transmitting the image with the operation content, and receiving the combined moving image C on which the operation content has been reflected.

Figure 4:
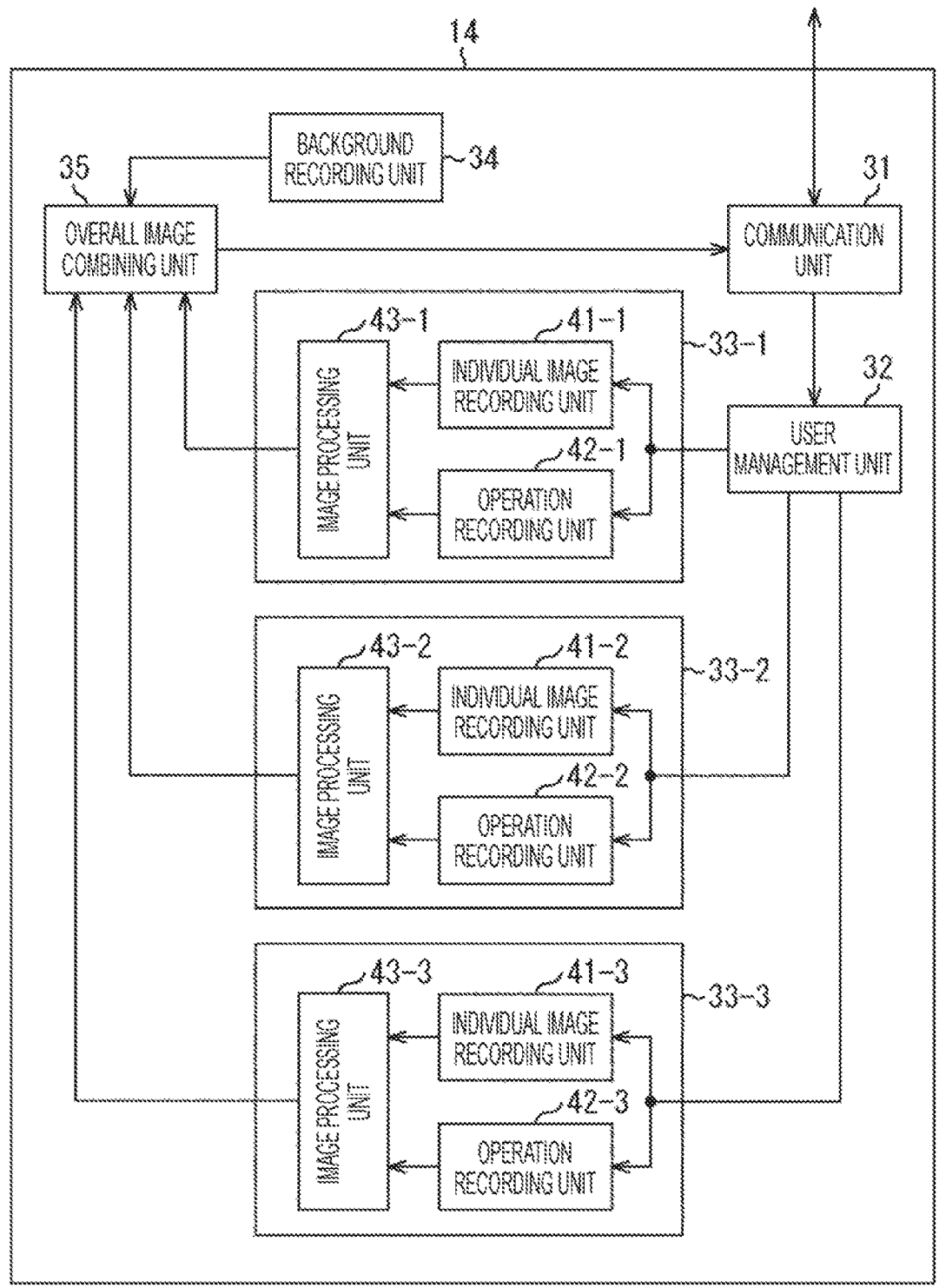
FIG. 4 is a block diagram illustrating an exemplary configuration of a distribution server.

Next, FIG. 4 is a block diagram illustrating an exemplary configuration of the distribution server 14 in FIG. 1.

As illustrated in FIG. 4, the distribution server 14 includes a communication unit 31, a user management unit 32, user individual processing units 33-1 to 33-3, a background recording unit 34, and an overall image combining unit 35.

The communication unit 31 receives the user-clipped moving image B transmitted from the communication unit 24 of the information processing apparatus 13 via the network 12 and supplies the received user-clipped moving image B to the user management unit 32. Moreover, the communication unit 31 transmits the combined moving image C supplied from the overall image combining unit 35 to the information processing apparatus 13 via the network 12.

The user management unit 32 performs processing of allocating the user-clipped moving images B for each of the information processing apparatuses 13 that have transmitted the user-clipped moving images B supplied from the communication unit 31. For example, in a case where communication is performed by the users of the information processing apparatuses 13-1 to 13-3, as illustrated in FIG. 1, the user management unit 32 allocates the user-clipped moving images B1 to B3, transmitted from the information processing apparatuses 13-1 to 13-3, to the user individual processing units 33-1 to 33-3, respectively. Specifically, the user management unit 32 supplies the user-clipped moving image B1 to the information processing apparatus 13-1, supplies the user-clipped moving image B2 to the information processing apparatus 13-2, and supplies the user-clipped moving image B3 to the information processing apparatus 13-3.

The user individual processing unit 33-1 includes an individual image recording unit 41-1, an operation recording unit 42-1, and an image processing unit 43-1.

The individual image recording unit 41-1 records the user-clipped moving image B1 of the information processing apparatus 13-1 supplied from the user management unit 32. In a case where operation content has been added to the user-clipped moving image B1 of the information processing apparatus 13-1 supplied from the user management unit 32, the operation recording unit 42-1 extracts and records the operation content. The image processing unit 43-1 performs, on the user-clipped moving image B1 of the information processing apparatus 13-1 recorded in the individual image recording unit 41-1, imaging processing in accordance with the operation content in the information processing apparatus 13-1 recorded in the operation recording unit 42-1, and supplies the processed image to the overall image combining unit 35.

At this time, the individual image recording unit 41-1 updates and records the user-clipped moving image B1 frame by frame. Meanwhile, the operation recording unit 42-1 updates and records the operation content solely when the operation content has been added to the user-clipped moving image B1. Accordingly, the image processing unit 43-1 continuously performs the image processing based on the same operation content on the user-clipped moving image B1 until the operation content recorded in the operation recording unit 42-1 is updated.

Similarly to the user individual processing unit 33-1, the user individual processing units 33-2 and 33-3 include individual image recording units 41-2 and 41-3, operation recording units 42-2 and 42-3, and image processing units 43-2 and 42-3, respectively. Similarly to the user individual processing unit 33-1, the user individual processing units 33-2 and 33-3 perform image processing on the user-clipped moving images B2 and B3, respectively, and supply the processed images to the overall image combining unit 35.

The background recording unit 34 records various background moving images as backgrounds of the user-clipped moving images B1 to B3 in the combined moving image C distributed from the distribution server 14 and supplies predetermined background moving image to the overall image combining unit 35.

The overall image combining unit 35 generates the combined moving image C by performing image processing of combining the user-clipped moving images B1 to B3 that have undergone image processing individually in the user individual processing units 33-1 to 33-3 with the background moving image supplied from the background recording unit 34. Then, the overall image combining unit 35 supplies the generated combined moving image C to the communication unit 31, and distributes the combined moving image C to the information processing apparatuses 13-1 to 13-3 via the network 12.

The distribution server 14 configured as described above is capable of individually performing image processing reflecting the operation content, on the user-clipped moving images B1 to B3. Then, the distribution server 14 is capable of distributing the combined moving image C obtained by combining the user-clipped moving images B1 to B3 in which the operation content has been reflected, to the information processing apparatuses 13-1 to 13-3.

In this manner, the communication system 11 including the information processing apparatuses 13-1 to 13-3 and the distribution server 14 enables users of the information processing apparatuses 13-1 to 13-3 to communicate with each other by the combined moving image C arranged in a same virtual space. Accordingly, the communication system 11 enables a plurality of users located at remote sites to communicate with each other with enhanced realistic feeling or togetherness, compared with a communication system in which the moving images A1 to A3 are arranged as they are on the same screen, for example.

Furthermore, the communication system 11 enables each of the users to perform various types of operation on one's user-clipped moving image B, for the combined moving image C displayed on the display unit 25 of the information processing apparatus 13. Since individual operation content is reflected in real time, the user can concentrate on communication without feeling stress such as one felt when intended operation is not reflected. Accordingly, the communication system 11 makes it possible to achieve better communication among a plurality of users at remote sites.

Next, user's operation performed on the combined moving image C displayed on the display unit 25 of the information processing apparatus 13 will be described with reference to FIGS. 5 to 12.

Figure 5:
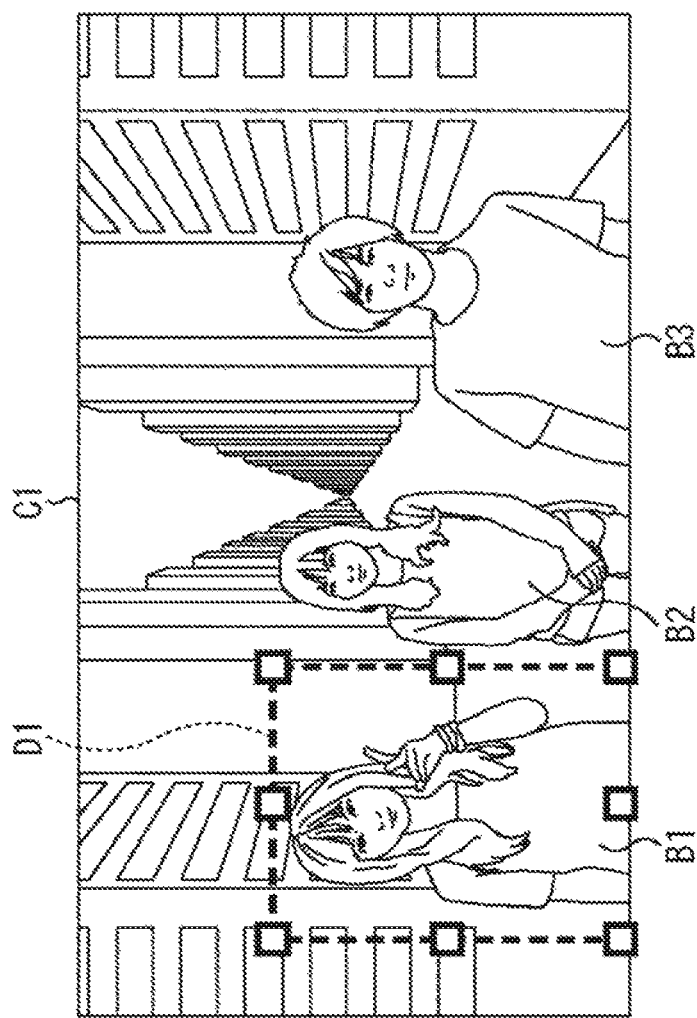
FIG. 5 is a view for describing operation of free deformation applied to a user-clipped moving image.

FIG. 5 illustrates an example in which the user of the information processing apparatus 13-1 performs operation of free deformation on the user-clipped moving image B1.

For example, the user of the information processing apparatus 13-1 touches and designates the user-clipped moving image B1 displayed on the display unit 25, and thereafter operates a button (not illustrated) for designating operation of free deformation. In response to this, as illustrated in FIG. 5, the operation unit 26 displays the combined moving image C1 on which the user interface D1 for performing free deformation is superimposed, on the display unit 25 so as to enclose the user-clipped moving image B1 in a rectangle.

Then, the user can enlarge the user-clipped moving image B1 by moving a grid displayed at each of four corners or centers of four sides of the user interface D1 outward while touching the grid and can reduce the user-clipped moving image B1 by moving the grid inward while touching the grid. Moreover, the user can translate the user-clipped moving image B1 by moving any one point inside the user interface D1 while touching the point. Moreover, the user can rotate the user-clipped moving image B1 by relatively rotating any two points inside the user interface D1 while touching the two points.

In accordance with the operation, for example, operation content (for example, touch position) is added to the user-clipped moving image B1 frame by frame and transmitted from the information processing apparatus 13-1. Subsequently, in the distribution server 14, the image processing unit 43-1 can perform image processing according to the operation content on the user-clipped moving image B1. Accordingly, the information processing apparatus 13-1 makes it possible to display the combined moving image C1 in which the free deformation using the user interface D1 has been reflected on the user-clipped moving image B1, in a state where the user is moving.

This enables the user of the information processing apparatus 13-1 to change the size and arrangement of the user-clipped moving image B1 in real time while confirming the size and arrangement of the user-clipped moving images B2 and B3 combined in the combined moving image C1.

Figure 6:
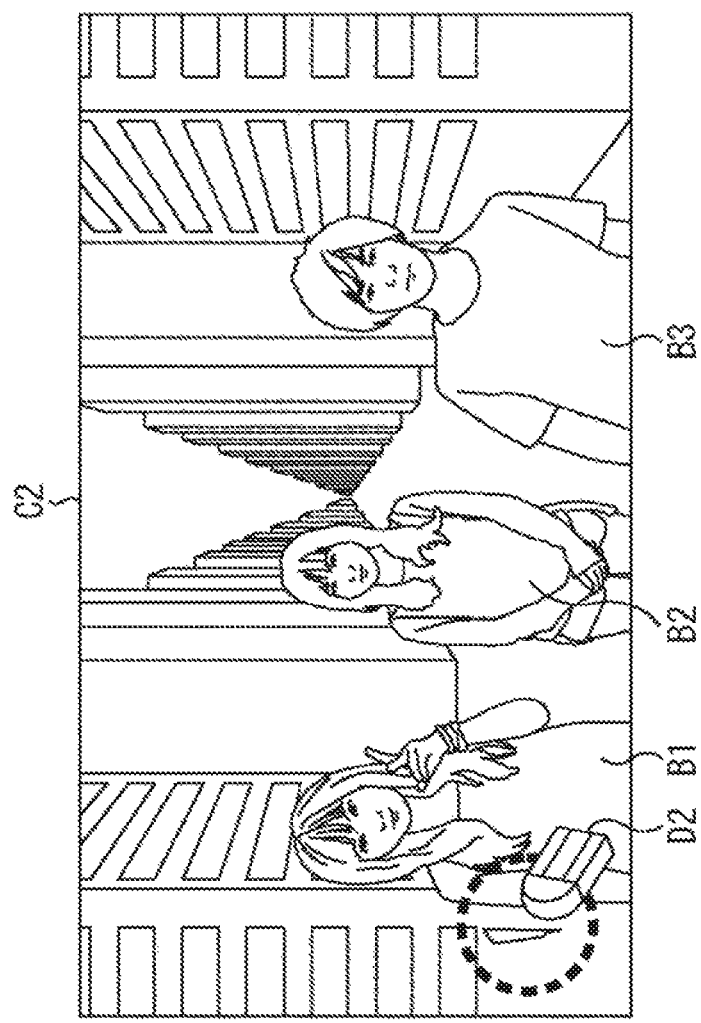
FIG. 6 is a view for describing operation of removing an unnecessary region applied to a user-clipped moving image.

FIG. 6 illustrates an example in which the user of the information processing apparatus 13-1 performs operation of removing an unnecessary region of the user-clipped moving image B1.

For example, when the clipped image generation unit 23 performs image processing of clipping the user-clipped moving image B1 from the moving image A1, there might be a case where an unnecessary region to be deleted remains as a result of erroneous recognition of the region in which the user is displayed. For example, a combined moving image C2 illustrated in FIG. 6 indicates a state where an unnecessary region remains on the outside of the right arm of the user-clipped moving image B1, as indicated by the broken line.

In this case, if the user touches the user-clipped moving image B1 by operating a button (not illustrated) to designate removal of the unnecessary region, an eraser-shaped user interface D2 for removing the unnecessary region is superimposed and displayed on the combined moving image C2. Then, if the user rubs the unnecessary region while touching the region, the unnecessary region turns into a non-display state. Moreover, if the user operates a button (not illustrated) for designating cancellation of removal of the unnecessary region, the deletion of the unnecessary region is reset, and the unnecessary region in the non-display state is displayed.

At this time, the image processing unit 43 can hold likelihood information indicating the likelihood of being an unnecessary region for each of region pixels and can perform image processing of removing the pixel such that the higher the likelihood, the pixel is removed to have higher transparency.

For example, image processing based on likelihood information will be described with reference to FIG. 7.

The upper side portion of FIG. 7 illustrates a likelihood information image E1 displayed in a density according to the likelihood information corresponding to the moving image Awhile the lower side portion of FIG. 7 illustrates a likelihood information image E2 indicating a state in which the unnecessary region is being deleted using the user interface D2.

For example, operation conventionally performed in units of pixel on a region in the vicinity of the clipping target object such as a user, specifically, operation such as removal of surrounding dust data, blurring, bordering using touch or pen input is not only delicate work but also involves difficulty in input and possible erroneous operation since the target object is moving because it is in a moving image.

In contrast, the information processing apparatus 13 adds, to the user-clipped moving image B, likelihood information indicating the possibility that the object is really a target object (the higher the possibility, the higher the likelihood of the region being an actual target object) for each of the pixels of the user-clipped moving image B, and transmits together. This enables the image processing unit 43 to automatically adjust the impact degree of the operation in accordance with the target object likelihood of the pixel of the user-clipped moving image B.

For example, when calculating the distance to the object, the distance measurement unit 22 obtains probability information indicating the probability of the calculation result being correct and supplies the probability information to the clipped image generation unit 23. Then, when generating the user-clipped moving image B from the moving image A, the clipped image generation unit 23 adds likelihood information indicating that the object is a clipping target object in units of pixel.

The likelihood information image E1 in FIG. 7 indicates that the darker the pixel, the higher the likelihood of the object being the target object. Then, when the user deletes an unnecessary region in the vicinity of the user using the user interface D2, by performing deletion to allow the impact degree to become higher in inverse proportion to the likelihood so as not to remove pixels having a certain level of likelihood or higher, it is possible to make it easy to leave solely the target object without carefully tracing the surrounding portion.

In this manner, regarding the deleted unnecessary region, deletion of the unnecessary region appearing in the same area is continuously performed even in the following frames.

For example, processing of continuously deleting an unnecessary region will be described with reference to FIG. 8.

As illustrated in the clipped moving image E3 in the upper side portion of FIG. 8, there are unnecessary regions in the vicinity of the user and portions close to an end portion of the screen, indicated by gray hatching, that remain unintentionally in the user-clipped moving image B as a result of being clipped even though it is not a clipping target object intended by the user. In order to delete such unnecessary regions, the user performs operation of deleting the unnecessary region in the clipped moving image E3 using the eraser-shaped user interface D2 as illustrated in FIG. 6.

For example, the clipped moving image E3 includes deletion regions D2-*a* and D2-*b* in which the user has performed unnecessary region deletion operation using the user interface D2.

Then, in the clipped moving image E4 in the frame following the clipped moving image E3, the position displayed is moved due to movement of the user. At this time, the unnecessary region might move together with the user as the target of clipping depending on the characteristic of the unnecessary region, and thus, the unnecessary region might have moved from the position designated in the clipped moving image E3 in a previous frame.

Accordingly, the deletion region D2-*b* is set to move corresponding to the movement of the user, with the center of the user's face as a reference, for example. In this manner, by recording merely the relative position and the relative size from a portion of the range (for example, user's face) automatically detectable among the clipped moving image E3, it is possible to automatically remove an unnecessary region of an aimed size at an aimed position, in each of the frames. That is, even in a case where the unnecessary region is a region that changes its position frame by frame, the user can easily continue deletion of such unnecessary region without designating the position to be deleted for each of the frames.

Note that this center extraction method is considered to detect a point that facilitates feature point analysis of the target object region, for example, the center position of the face and its size. With this technique, with a single instruction given by the user, it is possible to continuously reflect operation in consecutive moving images even if the operation cannot be expressed by affine transformation.

In contrast, since the deletion region D2-*a* appears fixedly in the vicinity of the end portion of the screen without movement, and thus fixedly set with the end portion of the screen as a reference, for example.

Figure 9:
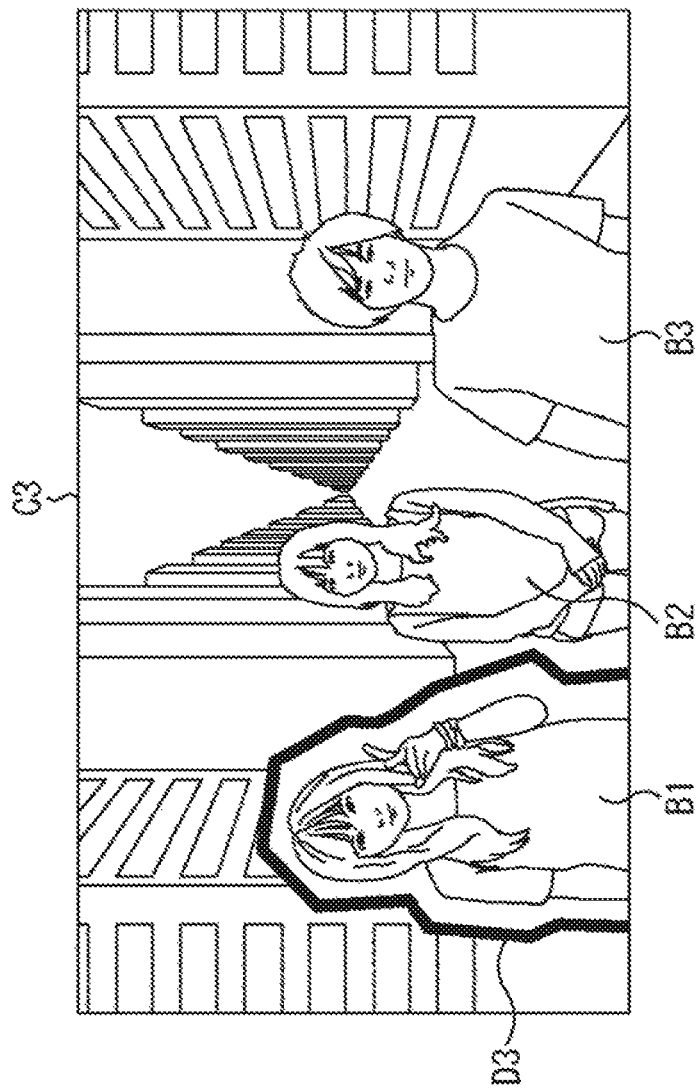
FIG. 9 is a view for describing operation of setting a border design around a user-clipped moving image.

FIG. 9 illustrates an example in which the user of the information processing apparatus 13-1 sets a border design around the user-clipped moving image B1.

For example, the user touches and designates the user-clipped moving image B1 displayed on the display unit 25, and thereafter operates a button (not illustrated) for designating border design setting. In response to this, as illustrated in FIG. 9, a combined moving image C3 is displayed in which a border design D3 is superimposed so as to enclose the user-clipped moving image B1. Note that the border design D3 is displayed not only on the display unit 25 of the information processing apparatus 13-1 but also on the display units 25 of the information processing apparatuses 13-2 and 13-3.

Moreover, the user can designate, for example, the type of border to be designed (shape, color, and the like), the border region (width from the person toward the outside), or the degree of blurring of the clipped edge. Then, if these items are designated, designated content is added as operation content to the user-clipped moving image B1, transmitted to the distribution server 14, and recorded in the operation recording unit 42-1. Then, the image processing unit 43-1 can perform image processing of generating the border design D3 in response to user's movement in accordance with the operation content recorded in the operation recording unit 42-1. In this manner, the designated content is reflected on the border design D3 in real time.

Figure 10:
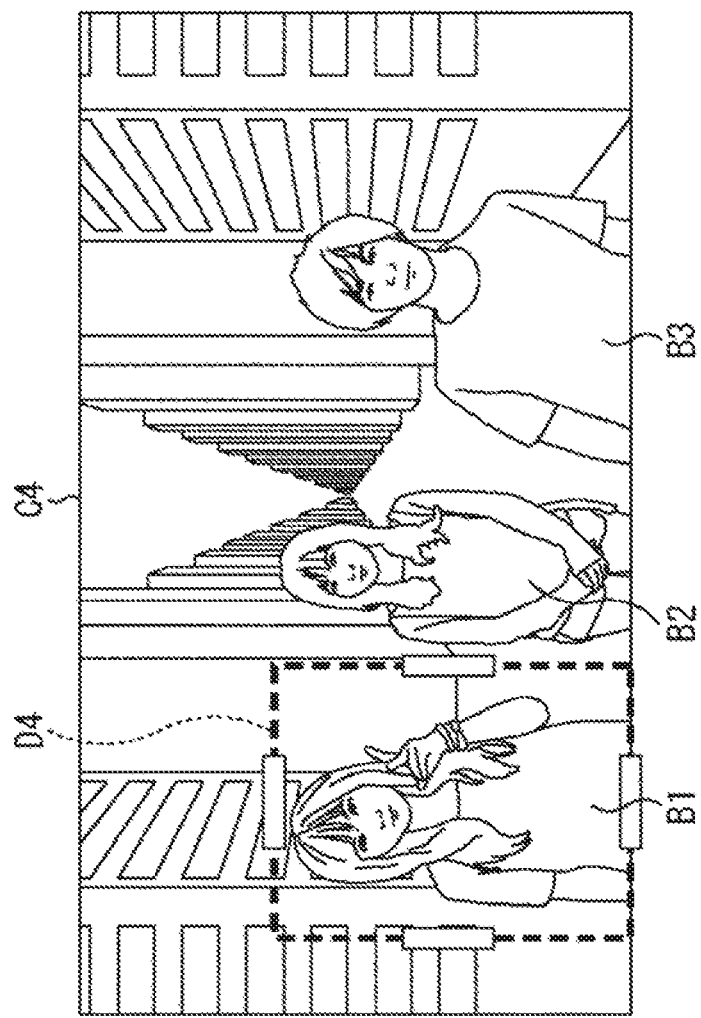
FIG. 10 is a view for describing trimming operation applied to a user-clipped moving image.

FIG. 10 illustrates an example in which the user of the information processing apparatus 13-1 performs operation of trimming the user-clipped moving image B1.

For example, the user touches and designates the user-clipped moving image B1 displayed on the display unit 25, and thereafter operates a button (not illustrated) for designating trimming operation. In response to this, as illustrated in FIG. 10, the operation unit 26 displays a combined moving image C4 on which a user interface D4 for performing trimming is superimposed, on the display unit 25 so as to enclose the user-clipped moving image B1 in a rectangle.

Then, the user can perform operation of designating a region outside the user interface D4 that is not partially displayed, by moving a grid displayed at each of centers of four sides of the user interface D4 inward while touching the grid. In accordance with this operation, for example, operation content (for example, position and size of the user interface D4) is added to the user-clipped moving image B1 frame by frame and transmitted from the information processing apparatus 13-1. Subsequently, in the distribution server 14, the image processing unit 43-1 can perform image processing according to the operation content on the user-clipped moving image B1. Accordingly, the information processing apparatus 13-1 makes it possible to display the combined moving image C4 in which the trimming using the user interface D4 has been reflected on the user-clipped moving image B1 in a state where the user is moving.

Figure 11:
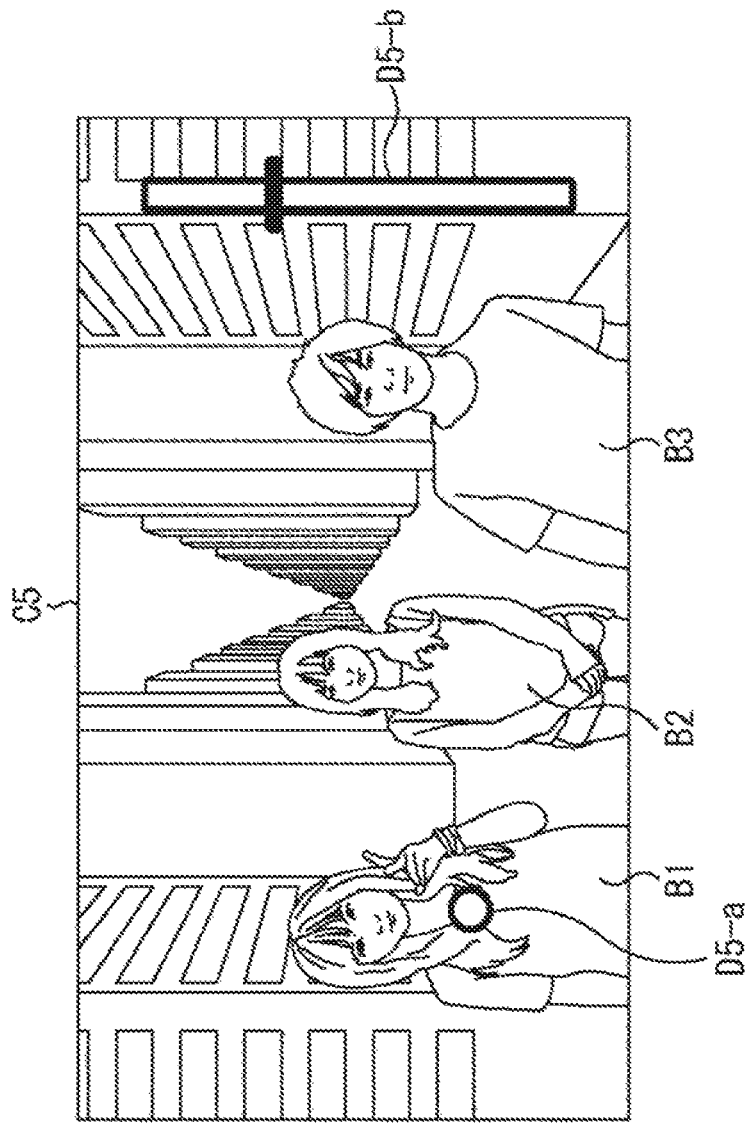
FIG. 11 is a view for describing operation of designating depth coordinates applied to a user-clipped moving image.

FIG. 11 illustrates an example in which the user of the information processing apparatus 13-1 performs operation of designating depth (Z axis) coordinates of the user-clipped moving image B1.

For example, the user touches and designates the user-clipped moving image B1 displayed on the display unit 25, and thereafter operates a button (not illustrated) for designating the depth coordinates. In response to this, as illustrated in FIG. 11, the operation unit 26 displays, on the display unit 25, a combined moving image C5 on which user interfaces D5-*a* and D5-*b* used for designating the display position of the user-clipped moving image B1 in the depth direction is superimposed.

Figure 12A:
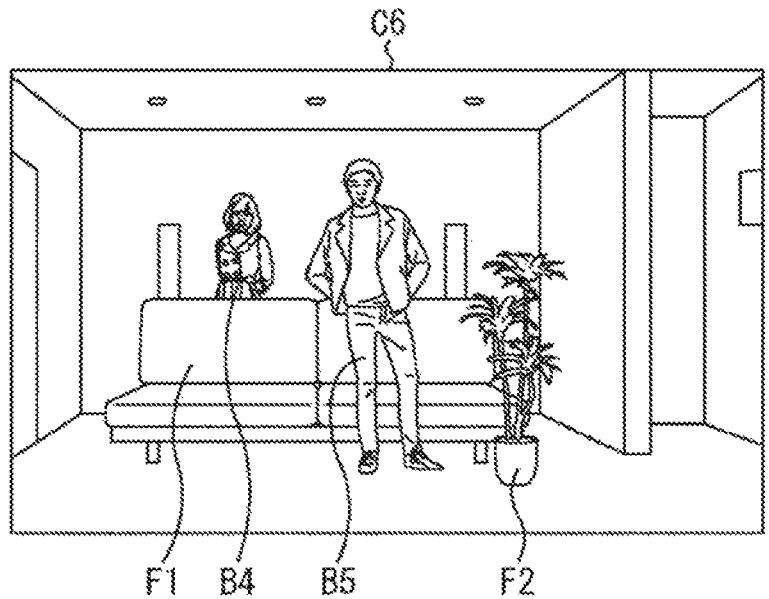
FIGS. 12A and 12B are views for describing depth coordinates.
Figure 12B:
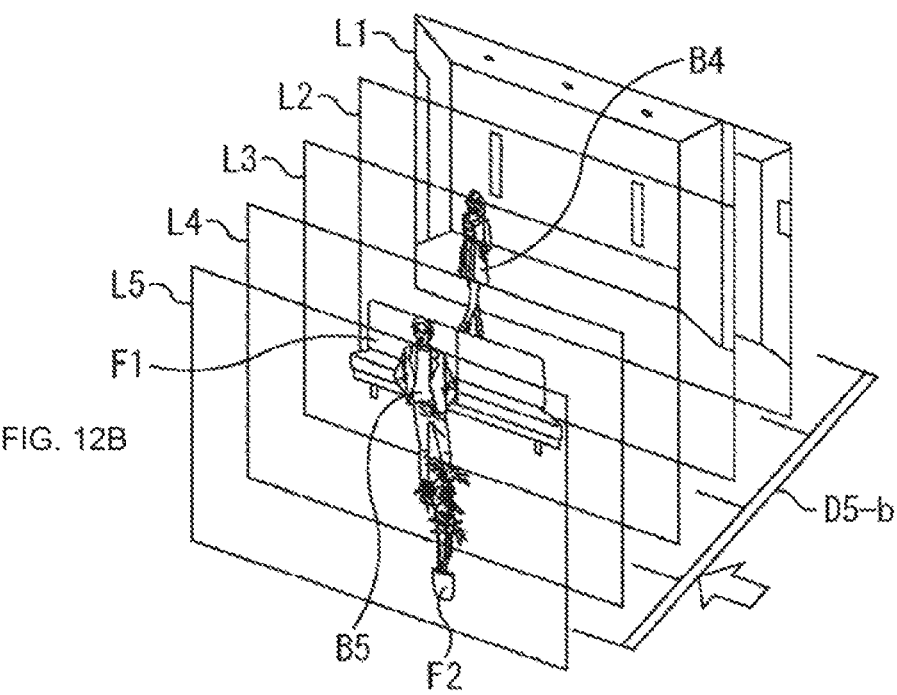

The user interface D5-*a* is displayed for specifying the object selected as the target for designating the depth coordinates. In the combined moving image C5 illustrated in FIG. 11, the user interface D5-*a* is displayed so as to be superimposed on the user-clipped moving image B, indicating that the user-clipped moving image B is selected as a target for designating the depth coordinates. Note that, as the target for designating the depth coordinates, for example, it is also possible to select a virtual object F1 or F2 as illustrated in FIGS. 12A and 12B to be described below.

The user interface D5-*b* is an indicator for changing the depth coordinates, and it is possible to change the depth coordinates of the target selected on the user interface D5-*a* by performing operation of moving a slider. For example, setting is designated as a maximum depth (layer on most backward side) by moving the slider of the user interface D5-*b* to the uppermost end, and designated as a minimum depth (layer on most forward side) by moving the slider of the user interface D5-*b* to the lowermost end.

In accordance with this operation performed on the user interface D5-*b*, operation content (for example, depth coordinates) is added to the user-clipped moving image B1 frame by frame and transmitted from the information processing apparatus 13-1. Then, in the distribution server 14, the image processing unit 43-1 can set a layer for the user-clipped moving image B1 in accordance with the operation content and combining processing by the overall image combining unit 35 is performed in a sequence corresponding to the layer. Accordingly, the user of the information processing apparatus 13-1 can set the depth coordinates of the user-clipped moving image B1 while confirming the relative depth with respect to the user-clipped moving image B2 or B3.

The user interface D5-*b* will be further described with reference to FIGS. 12A and 12B.

FIG. 12A illustrates a combined moving image C6 obtained by combining the user-clipped moving images B4 and B5 with the virtual objects F1 and F2, and FIG. 12B illustrates a layer structure of the combined moving image C6.

As illustrated in FIG. 12B, the combined moving image C6 is formed by stacking five layers L1 to L5. A background image is set in the layer L1 and the user-clipped moving image B4 is set in the layer L2, in order from the backward side of the layer structure. Furthermore, the virtual object F1 (sofa) is set in the layer L3, the user-clipped moving image B5 is set in the layer L4, and the virtual object F2 (foliage plant) is set in the layer L5.

As a result, as illustrated in FIG. 12A, in the combined moving image C6, for example, the user-clipped moving image B4 is displayed behind the virtual object F1, while the user-clipped moving image B5 is displayed in front of the virtual object F1. In addition, the user interface D5-*b* displayed in the combined moving image C5 in FIG. 11 corresponds to the depth coordinates of the layers L1 to L5 as illustrated in FIG. 12B.

Meanwhile, in the communication system 11, the background moving image and the user-clipped moving image B are arranged in a space represented by the X axis direction, the Y axis direction, and the Z axis direction, and the combined moving image C obtained by combining individual images is displayed in the display unit 25. In addition, since the combined moving image C is displayed two-dimensionally on the display unit 25, it would be difficult to intuitively perform operation in a depth direction (Z-axis direction) while the user can intuitively perform operation easily in the two-dimensional directions (X-axis direction and Y-axis direction).

Accordingly, in a case where the operation of setting depth coordinates is selected, the communication system 11 can temporarily display a layered structure as illustrated in FIG. 12B during the time when the operation is being performed. For example, a layered structure in which all the moving images used when the overall image combining unit 35 generates the combined moving image C are arranged obliquely in accordance with layer information thereof is transmitted from the distribution server 14 to the information processing apparatus 13.

This enables the user to visually grasp the depth coordinates of all the moving images and to easily perform operation of setting the desired depth information.

For example, in a case where the user of the user-clipped moving image B4 is to be placed in front of the user-clipped moving image B5 and behind the virtual object F2, it is possible to display a layer structure as illustrated in FIG. 12B and to select a desired position (for example, position indicated by a hollow arrow) on the user interface D5-*b*. With this operation, it is possible to provide more intuitive operation than operation of inputting the depth (Z axis) coordinates with an absolute value, for example.

As described above, the user can perform operation on the user-clipped moving image B using various user interfaces, and can easily reflect the operation on the combined moving image C.

Meanwhile, assuming that the user-clipped moving image B before the operation is in a space of three dimensions, that is, the X-axis direction (horizontal direction), the Y-axis direction (vertical direction), and the Z-axis direction (depth direction), the operation content is classified into one that can express the user-clipped moving image B after the operation by affine transformation and one that cannot express the user-clipped moving image B after the operation by affine transformation. Note that in the present specification, affine transformation will be described as an example of image processing that uses a transformation parameter that is uniquely determined corresponding to the user-clipped moving image even if the user moves in image processing according to the operation content. Alternatively, it is of course possible to apply, in image processing using such transformation parameters, transformation other than affine transformation (for example, projective transformation, similarity transformation, or inversion transformation).

That is, the operation content that can be expressed by affine transformation is operation (refer to FIG. 5) such as enlargement or reduction, translation, and rotation of the user-clipped moving image B. For example, when the center coordinates of the user-clipped moving image B before the operation are fixed as the origin of the transformation, the operation once designated by the user can be continuously reflected even in the case of continuous moving images by continuing execution of same processing for the target region for each of the frames.

In contrast, operation content that cannot be expressed by affine transformation corresponds to operation of trimming a region designated by the user (refer to FIG. 10), operation of removing a portion designated by the user by the pixel flattening processing (refer to FIG. 6), or the like, among the user-clipped moving image B.

Accordingly, the operation content transmitted from the information processing apparatus 13 to the distribution server 14 can include information indicating whether the operation can be expressed by affine transformation, in addition to the information indicating the operation content itself.

FIG. 13 is a diagram illustrating the format of the operation content transmitted from the information processing apparatus 13 to the distribution server 14.

As illustrated in the figure, the operation content includes an operation ID (identification), a target user ID, type information, reference information, a transform flag, remaining time information, and a transformation parameter.

In order to identify all operation content transmitted and received by the communication system 11, for example, a number that is advanced and registered in accordance with the order of transmission and reception is set as the operation ID.

The number allocated for identifying the information processing apparatus 13 connected to the communication system 11 is set as the target user ID. For example, the target user ID "0" is allocated to the information processing apparatus 13-1, the target user ID "1" is allocated to the information processing apparatus 13-1, and the target user ID "2" is allocated to the information processing apparatus 13-1.

The information indicating the operation content performed by the user is set as the type information. For example, as described above with reference to FIG. 6, in a case where the user performs operation of deleting an unnecessary region, the type information "delete" is set. Moreover, in a case where the user performs operation of enlarging the user-clipped moving image B using the user interface D1 illustrated in FIG. 5, the type information "enlargement" is set. Moreover, in a case where the user performs operation of achieving a presentation effect by a predetermined animation, for example, the type information "animation" is set. Furthermore, in a case where the user performs operation of trimming the user-clipped moving image B using the user interface D4 illustrated in FIG. 10, the type information "trimming" is set.

Information indicating a position to be a reference in reflecting the operation content is set as reference position information. For example, as described above with reference to FIG. 8, reference information "face center" is set in a case where operation of deleting an unnecessary region with reference to the center of the face of the user-clipped moving image B is performed. Similarly, as described above with reference to FIG. 8, in a case where operation of deleting an unnecessary region around the upper right end of the user interface D2-a is performed, the reference information "upper right" is set.

Information indicating whether the operation content is reflected by affine transformation is set in the transform flag. For example, in a case where the operation content is deletion or trimming, a transform flag "N" indicating that the operation content is not reflected by affine transformation is set. In contrast, in a case where the operation content is enlargement or animation, a transform flag "Y" indicating that the operation content is reflected by transformation is set.

Information indicating remaining time until the reflection of the operation content is finished is set in the remaining time information. For example, in a case where the time for reflecting the operation content is not designated when the operation is performed, remaining time information "infinity" is set. Moreover, in a case where the time for reflecting the operation content is designated when the operation is performed, for example, in a case where the time is 25 seconds, the remaining time information is set as "t=25".

Various parameters needed for reflecting the operation content are set as the transformation parameter. For example, as described above with reference to FIG. 8, in a case where a user performs operation of deleting an unnecessary region, a transformation parameter of "positional relationship with respect to a relative center and intensity" indicating a positional relationship with respect to a position set as a deletion reference and intensity in performing deletion is set. Moreover, in a case where the user performs operation of enlarging the user-clipped moving image B using the user interface D1 illustrated in FIG. 5, a transformation parameter of "enlargement center and enlargement rate" indicating a center position set as an enlargement reference and an enlargement rate in performing enlargement is set.

Moreover, in a case where the user performs operation of achieving a presentation effect by a predetermined animation, for example, "animation ID" designating animation is set as the transformation parameter. Moreover, in a case where the user performs operation of trimming the user-clipped moving image B using the user interface D4 illustrated in FIG. 10, a transformation parameter "relative position from the center, relative size" indicating the position for performing relative trimming with respect to the position set as the trimming reference and the size is set.

With transmission of the operation content in the format as described above from the information processing apparatus 13 to the distribution server 14, it is possible on the distribution server 14 to perform image processing according to the operation content.

Figure 14:
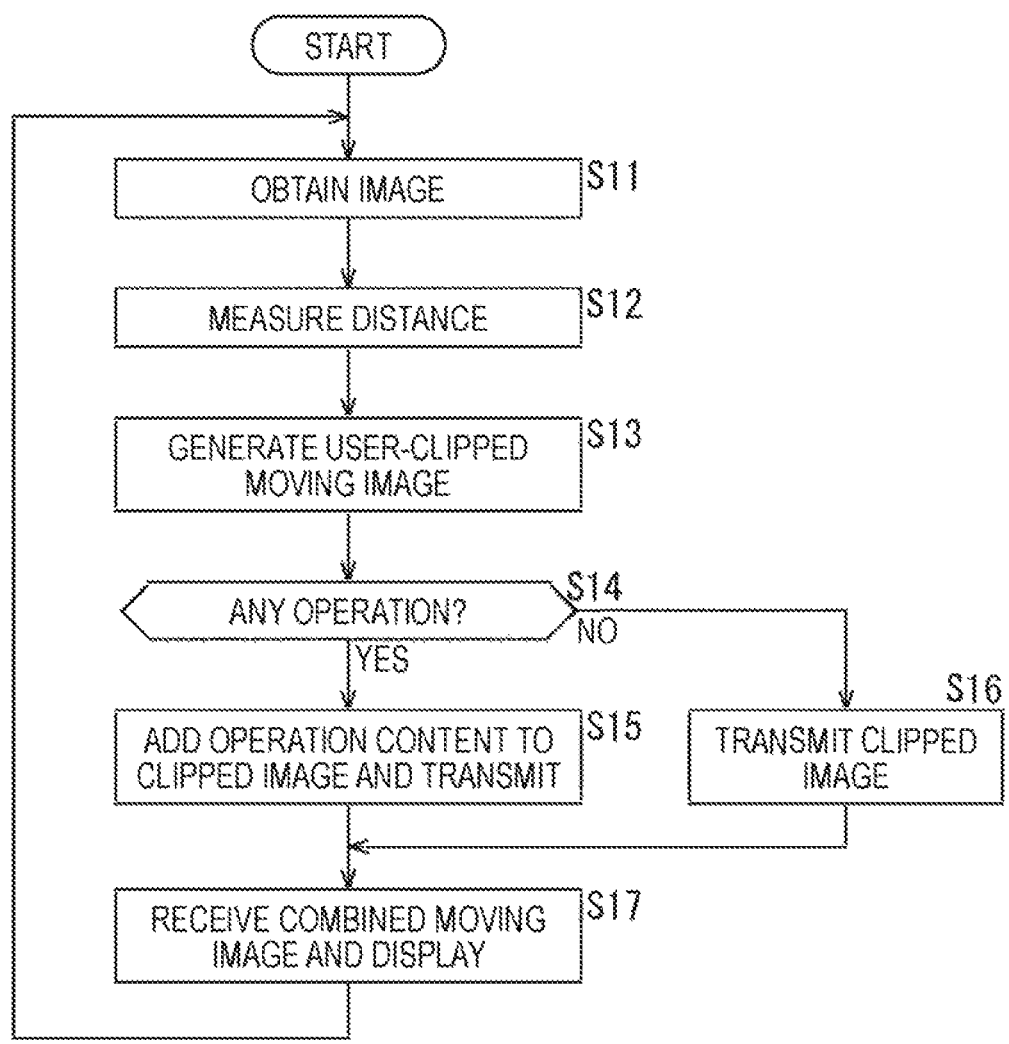
FIG. 14 is a flowchart for describing processing performed on the information processing apparatus.

Next, FIG. 14 is a flowchart for describing processing performed on the information processing apparatus 13 in FIG. 3.

For example, the processing is started after the user performs operation on the operation unit 26 to prompt participation in a service provided in the communication system 11. In step S11, the digital signal processing unit 21 obtains a moving image A (refer to FIG. 2) captured by an imaging device (not illustrated) and applies digital signal processing to the moving image A, and supplies image data for each of the frames constituting the moving image A to the clipped image generation unit 23.

In step S12, the distance measurement unit 22 calculates, for example, a parallax between a plurality of moving images, generates a depth map that maps a distance from the imaging device to the object for each of the pixels, and supplies the depth map to the clipped image generation unit 23.

In step S13, the clipped image generation unit 23 performs image processing of clipping a target object from the moving image A supplied from the digital signal processing unit 21 in step S11 on the basis of the depth map supplied from the distance measurement unit 22 in step S12. With this processing, the clipped image generation unit 23 generates the user-clipped moving image B and supplies the image to the communication unit 24.

In step S14, the communication unit 24 determines whether there has been operation performed by the user. For example, if the operation content corresponding to the operation by the user is supplied from the operation unit 26, the communication unit 24 determines that there has been operation by the user. If the operation content is not supplied from the operation unit 26, the communication unit 24 determines that there has been no operation by the user.

In a case where it is determined in step S14 that there has been operation by the user, the processing proceeds to step S15, the communication unit 24 adds the operation content to the user-clipped moving image B supplied from the clipped image generation unit 23 in step S13 and transmits the image to the distribution server 14.

In contrast, in a case where it is determined in step S14 that there has been no operation by the user, the processing proceeds to step S16, and the communication unit 24 transmits the user-clipped moving image B supplied from the clipped image generation unit 23 in step S13 to the distribution server 14.

After the processing of step S15 or S16, the processing proceeds to step S17, and the communication unit 24 receives the combined moving image C transmitted from the distribution server 14 and supplies the image to the display unit 25, and then, the display unit 25 displays the combined moving image C. Thereafter, the processing returns to step S11 and similar processing is then repeated.

As described above, the information processing apparatus 13 can transmit the user-clipped moving image B obtained by clipping the user from the moving image A to the distribution server 14. Moreover, in a case where the user performs operation, the operation content can be added to the user-clipped moving image B and transmitted to the distribution server 14.

Figure 15:
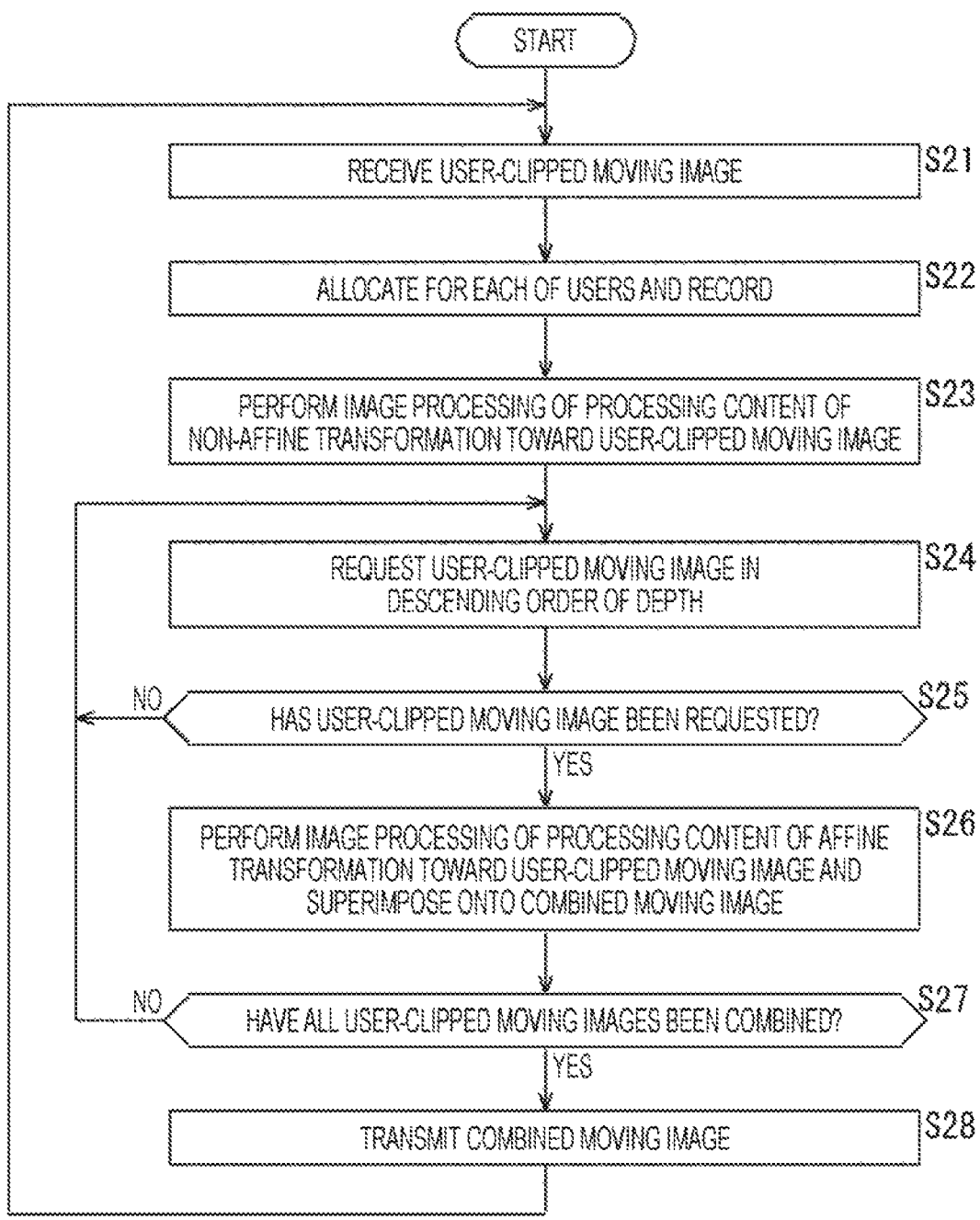
FIG. 15 is a flowchart for describing processing performed on the distribution server.

Next, FIG. 15 is a flowchart for describing the processing performed in the distribution server 14 in FIG. 4.

For example, processing is started when there is notification from a plurality of information processing apparatuses 13 that they would participate in a service provided in the communication system 11. In step S21, the communication unit 31 receives the user-clipped moving image B transmitted from the information processing apparatus 13 and supplies the received user-clipped moving image B to the user management unit 32.

In step S22, the user management unit 32 refers to the target user ID added to the user-clipped moving image B, for example, and transmits the user-clipped moving image B to the user individual processing unit 33 corresponding to the information processing apparatus 13 that has transmitted the user-clipped moving image B. With this processing, the user individual processing unit 33 records the user-clipped moving image B in the individual image recording unit 41, and if the operation content has been added to the user-clipped moving image B, the operation content is recorded in the operation recording unit 42.

In step S23, the image processing unit 43 individually performs image processing on the user-clipped moving image B in the user individual processing unit 33 in which processing content of non-affine transformation is recorded in the operation recording unit 42, among the predetermined number of user individual processing units 33 corresponding to the number of information processing apparatuses 13 connected to the communication system 11. That is, the image processing according to the operation content in which the transform flag "N" is set in the operation content recorded in the operation recording unit 42 of the user individual processing unit 33, for example, image processing corresponding to operation such as trimming and unnecessary region removal is individually performed.

In step S24, the overall image combining unit 35 requests the user-clipped moving image B in descending order of depth from the predetermined number of user individual processing units 33.

In step S25, the predetermined number of user individual processing units 33 determine whether the user-clipped moving image B has been requested. Then, on the user individual processing unit 33 that determines that the user-clipped moving image B has not been requested, the processing returns to step S24 and the processing is suspended. In contrast, the user individual processing unit 33 that determines that the user-clipped moving image B has been requested becomes a target to which the user-clipped moving image B is transmitted, and the processing proceeds to step S26.

In step S26, the target user individual processing unit 33 supplies the user-clipped moving image B in response to the request from the overall image combining unit 35. At this time, if the operation content for which the transform flag "Y" is set is recorded in the operation recording unit 42, the target user individual processing unit 33 also supplies the processing content together with the user-clipped moving image B to the overall image combining unit 35.

Then, the overall image combining unit 35 superimposes the user-clipped moving image B on the background moving image supplied from the background recording unit 34 in descending order of depth. At this time, if the processing content of affine transformation has been supplied, the overall image combining unit 35 performs image processing reflecting the processing content, for example, image processing corresponding to operation such as enlargement and reduction, and superimposes the user-clipped moving image B on the combined moving image C.

In step S27, the overall image combining unit 35 determines whether all the user-clipped moving images B corresponding to the predetermined number of user individual processing units 33 have been combined.

In a case where the overall image combining unit 35 determines in step S27 that all the user-clipped moving images B corresponding to the predetermined number of user individual processing units 33 have not been combined, the processing returns to step S24. Then, similar processing is repeated for the user-clipped moving image B having the next greatest depth as a target.

In contrast, in step S27, in a case where the overall image combining unit 35 determines that all the user-clipped moving images B corresponding to the predetermined number of user individual processing units 33 have been combined, the processing proceeds to step S28.

In step S28, the overall image combining unit 35 supplies the generated combined moving image C to the communication unit 31, and transmits the combined moving image C to the information processing apparatus 13 via the network 12. Thereafter, the processing returns to step S21, and similar processing is repeated for the next frame as a processing target.

As described above, the distribution server 14 can perform image processing for non-affine transformation processing individually and can perform image processing for affine transformation processing when combining the user-clipped moving image B. Additionally, it is possible to generate the combined moving image C by combining all the user-clipped moving images B in descending order of depth, and to transmit the combined moving image C to the information processing apparatus 13.

Note that the method by which the distance measurement unit 22 of the information processing apparatus 13 calculates the distance to the object is not limited to the above-described method of calculating the parallax, but may include various methods capable of generating a map for clipping the target object. For example, the distance measurement unit 22 may adopt a method of calculating the distance on the basis of a time difference from a point of emitting an infrared ray to the object until the infrared ray is reflected and returned, a method in which patterned light is emitted and the distance is calculated on the basis of the degree of deformation of the pattern according to the surface of the object.

Moreover, for example, it is possible to generate a moving image including a region in which the user is photographed (moving image excluding the regions other than the region in which the user is photographed) by imaging using a specific color such as green back or blue back as a background with a chroma key compositing technique and eliminating the background by making the component of the specific color transparent. That is, it is possible to generate a moving image including the region in which the use is photographed using a method of clipping the region in which the user is photographed to generate a user-clipped moving image, or other methods, and to combine the moving image into a combined moving image.

Moreover, sharing of functions provided as the whole communication system 11 including the information processing apparatus 13 and the distribution server 14, by the information processing apparatus 13 and the distribution server 14, is not limited to the above-described configuration illustrated in FIGS. 3 and 4. For example, the image processing for each of the user-clipped moving images B performed by the user individual processing unit 33 in the distribution server 14 may be performed in the information processing apparatus 13, and the user-clipped moving image B that has undergone image processing on the information processing apparatus 13 may be transmitted.

Moreover, there is no need to process the function of the information processing apparatus 13 within one apparatus. For example, these functions may be implemented as software on an information processing terminal such as a personal computer or a smartphone, digital signals may be obtained from an external camera device, and subsequent processing may be performed.

Figure 16:
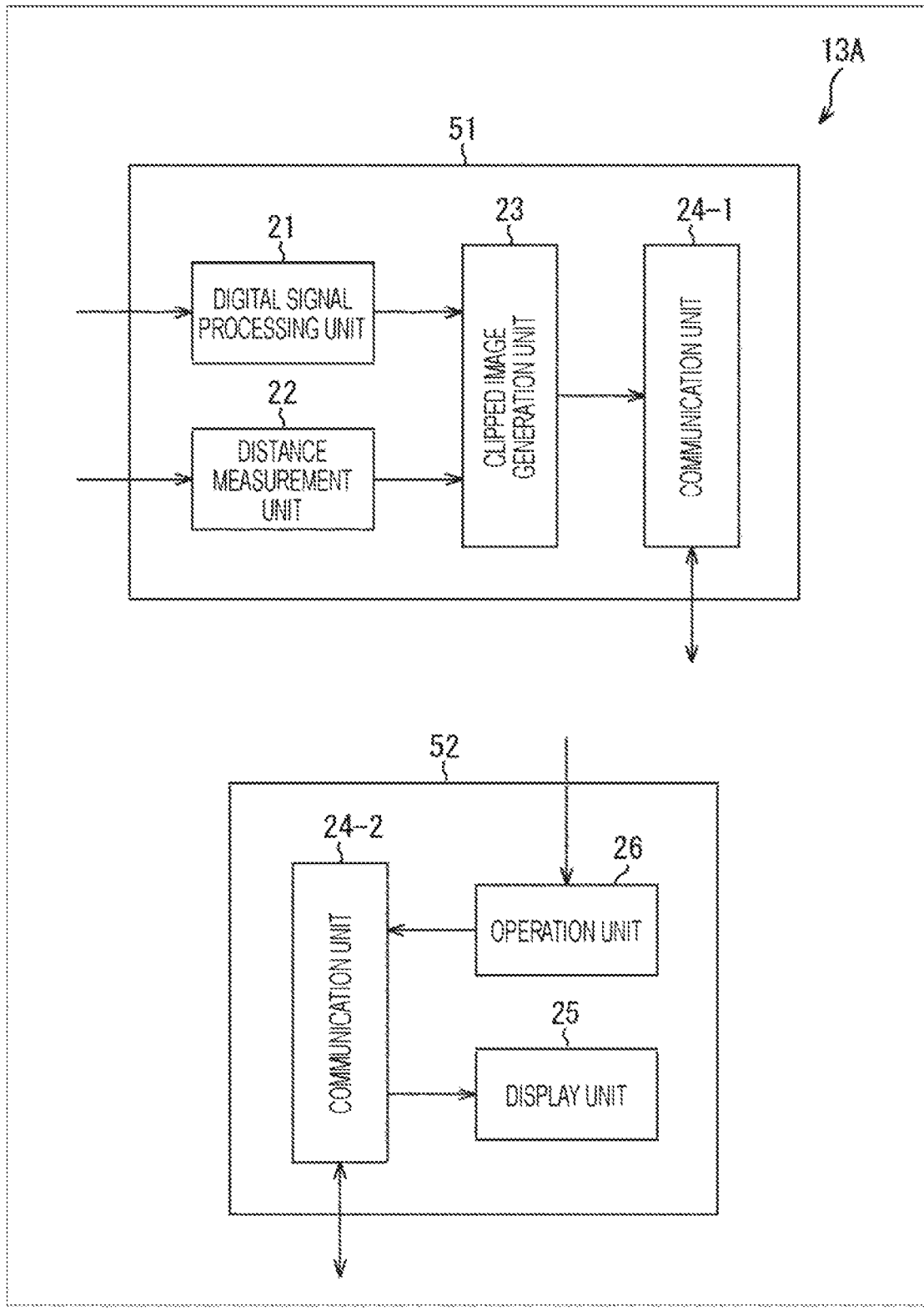
FIG. 16 is a block diagram illustrating a modification example of the information processing apparatus.

FIG. 16 is a block diagram illustrating a modification example of the information processing apparatus 13.

As illustrated in FIG. 16, the information processing apparatus 13A includes two individual apparatuses, that is, an image transmission apparatus 51 and a user interface apparatus 52.

The image transmission apparatus 51 includes a digital signal processing unit 21, a distance measurement unit 22, a clipped image generation unit 23, and a communication unit 24-1, and transmits the user-clipped moving image B generated by the clipped image generation unit 23 to the distribution server 14. For example, the image transmission apparatus 51 can be provided by software as a portion of functions of a camera device having an imaging function.

The user interface apparatus 52 includes a communication unit 24-2, a display unit 25, and an operation unit 26, displays the combined moving image C distributed from the distribution server 14 on the display unit 25, and transmits the operation content input by the user's operation on the operation unit 26 to the distribution server 14. For example, the user interface apparatus 52 can employ a web browser that provides input of operation content and display of images by software. In this case, the image displayed on the user interface apparatus 52, the operation content that has been input, and the like, are held as a web program on the side of the distribution server 14, and the user can use the function of the distribution server 14 by accessing the distribution server 14 from the web browser.

Furthermore, the communication system 11 may be configured to allow the display to change in response to the user's operation on the operation unit 26 as described above, or to change by interaction between the user-clipped moving images B, for example.

A change in display by interaction between user-clipped moving images B will be described with reference to FIG. 17.

Figure 17:
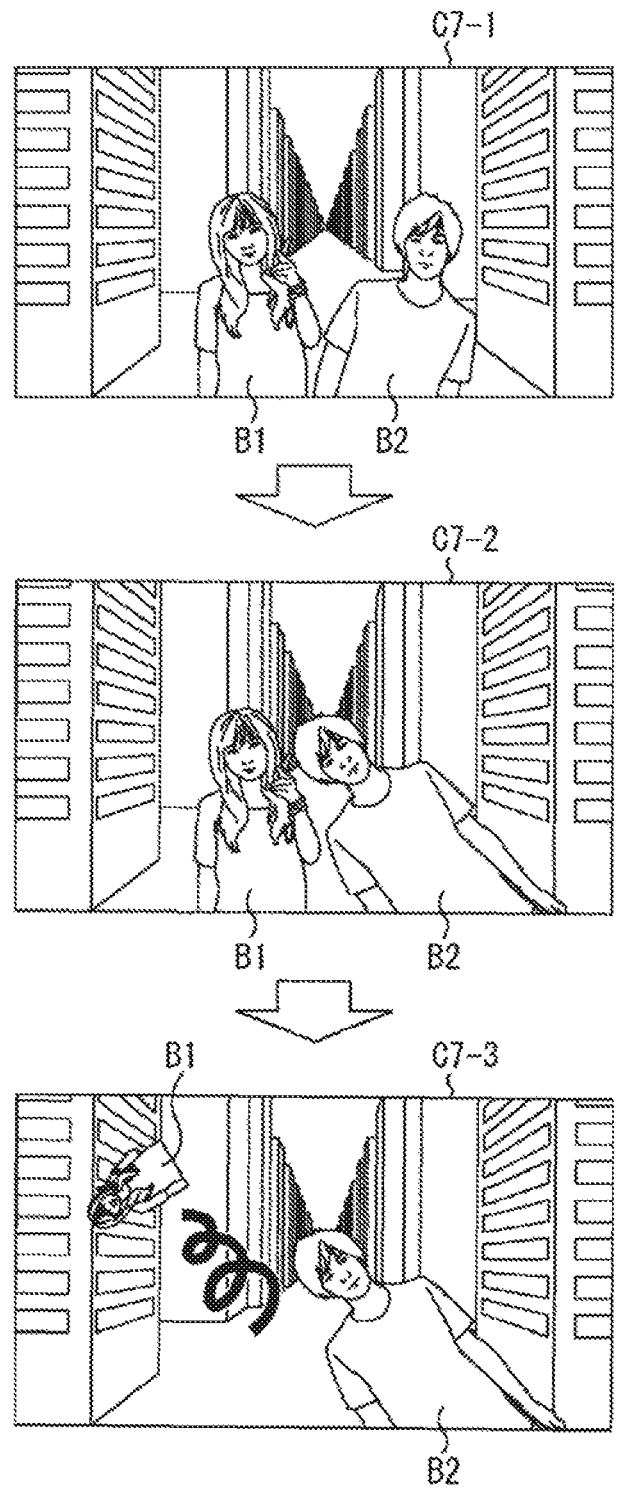
FIG. 17 is a view for describing a change in display due to interaction between user-clipped moving images.

As illustrated in a combined moving image C7-1 in the upper portion of FIG. 17, the user-clipped moving images B1 and B2 are displayed side by side. Moreover, layers of the user-clipped moving images B1 and B2 are set to the same depth coordinates.

At this time, as illustrated in a combined moving image C7-2 in the middle portion of FIG. 17, it is assumed that the user of the information processing apparatus 13-2 is inclined toward the user of the information processing apparatus 13-1 at a certain level of acceleration, and the head of the user-clipped moving image B2 touches the head of the user-clipped moving image B1. In this case, the overall image combining unit 35 can interpret the interaction as, for example, head-butting operation, and performs image processing according to the interaction.

With this processing, as illustrated in a combined moving image C7-3 in the lower portion of FIG. 17, the overall image combining unit 35 can perform image processing such that the user-clipped moving image B1 jumps while spinning.

The content of a display change corresponding to the interaction between the user-clipped moving images B and a condition for producing the display change can be set in advance by an administrator who provides the service by the communication system 11. Moreover, individual users may set the content and condition exclusively for themselves.

In this manner, in the communication system 11, it is possible to change the display automatically (without operation) corresponding to the predetermined interaction on the basis of the positional relationship and situation between the user-clipped moving images B in addition to operation using the user interface. Moreover, for example, it is possible to change the display automatically (without operation) in accordance with the positional relationship and the situation between the user-clipped moving image B and the background moving image.

Next, another exemplary processing performed by the communication system 11 will be described with reference to FIGS. 18 and 19.

Figure 18:
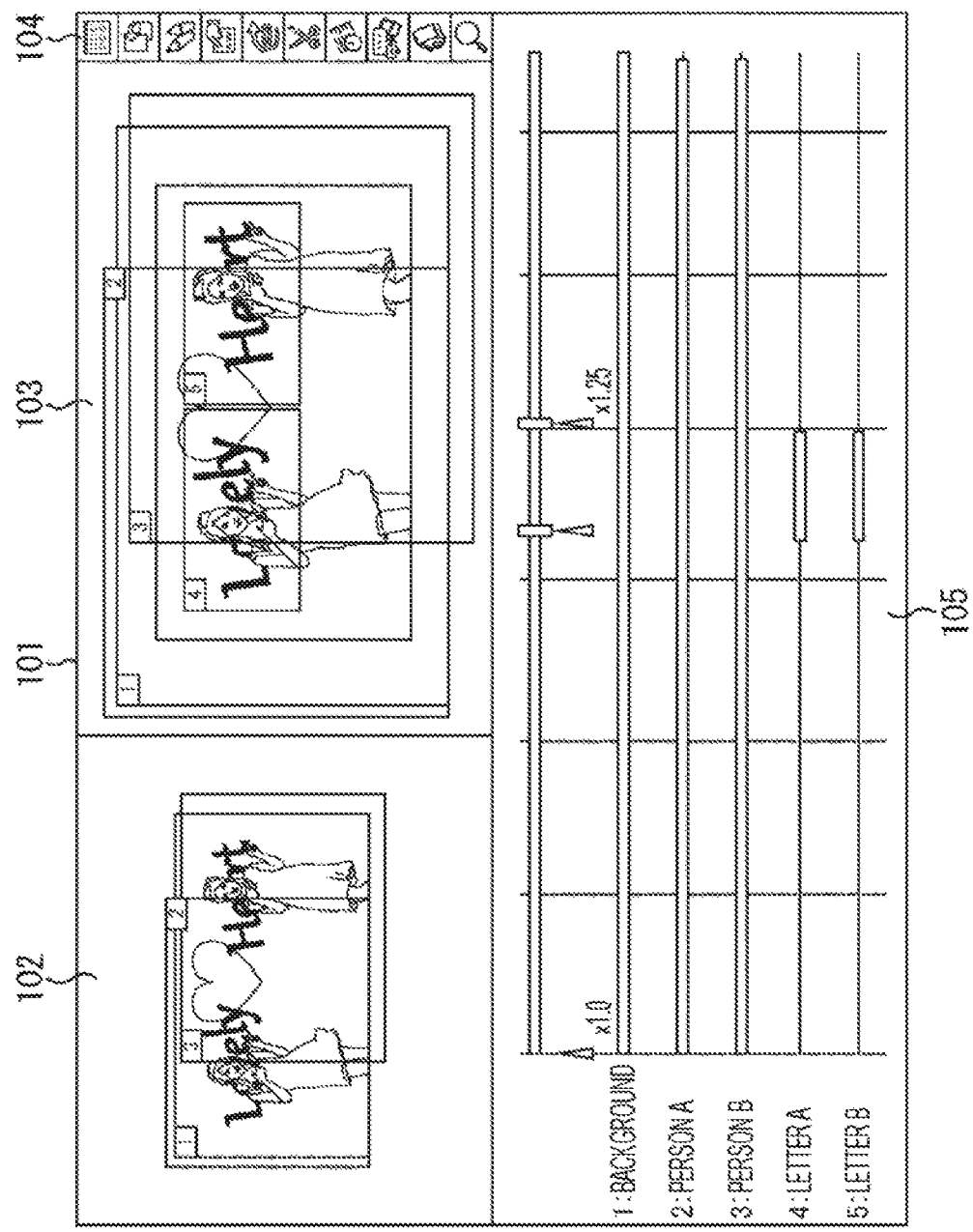
FIG. 18 is a view for describing processing of reflecting preregistered operation content at a designated time.

In FIG. 18, the processing of reflecting preregistered operation content at a designated time will be described.

As described above, in the communication system 11, various types of operation content are reflected on the user-clipped moving image in real time, and a combined moving image that has undergone image processing according to the operation content is distributed. On the other hand, the communication system 11 can be configured, for example, to allow the operation content to be preregistered so as to be reflected at a designated time, and to allow a combined moving image that has undergone the image processing according to the operation content to be distributed at a timing when the designated time arrives, instead of reflecting the operation content on the target object in real time.

An operation content registration screen 101 illustrated in FIG. 18 is used for preregistering the operation content, and displays a preview window 102, a work window 103, a tool bar 104, and a time management window 105.

The preview window 102 displays a current frame of the combined moving image distributed from the distribution server 14 and a layer structure of the frame. The example in FIG. 18 displays three layers and a layer number indicating the order of the individual layer at the upper left of the frame representing each of the layers. For example, the preview window 102 displays a combined moving image in which a background moving image is set in a layer with layer number 1, a person A on the left side is set in a layer with layer number 2, and a person B on the right side is set in a layer with layer number 3.

The work window 103 displays a layer for designating operation content. The example in FIG. 18 illustrates a state in which operation is performed on five layers, and displays a layer number indicating the order of the individual layer at the upper left of the frame representing each of the layers. For example, similarly to the preview window 102, letters A arranged on the left side are set in a layer with layer number 4 and letters B arranged on the right side are set in a layer with layer number 5, in addition to the layers with layer numbers 1 to 3.

The tool bar 104 displays buttons for selecting various tools to be used when designating the operation content.

The time management window 105 displays a time bar for each of the layers displayed in the work window 103. The time bar is provided to designate the timing of reflecting the operation content registered in the work window 103. For example, an arrow displayed at the left end of the time bar indicates the time of the currently displayed frame, and the operation content designated using the time bar is displayed so as to flow toward the left side with the lapse of time.

On this operation content registration screen 101, for example, it is possible to register in advance the timing of starting the reflection of the operation content and the timing of completing the reflection of the operation content, in association with the operation content.

For example, the operation content registration screen 101 illustrates an exemplary case where the operation content in which the display magnification of the combined moving image is currently set to 1 time (×1.0) and zooming is started from a predetermined timing to set the display magnification of the combined moving image to 1.25 times has been registered. For example, the display magnification change is started from the timing of the arrow illustrated on a leftward portion in the vicinity of the center on the operation content registration screen 101, and the display magnification is changed to 1.25 times (×1.25) at the timing of the arrow illustrated on the right thereof, at which the two people and the background are enlarged and displayed.

Moreover, on the operation content registration screen 101, operation content of displaying the letters A and B are registered during the period in which the display magnification is being changed. Accordingly, the letters A and B are displayed at the timing when zooming is started, and the letters A and B turn into non-display states at the timing when zooming is finished. At this time, the letters A and B are also enlarged and displayed in accordance with the change of the display magnification.

In this manner, by transmitting the operation content preregistered using the operation content registration screen 101 from the information processing apparatus 13 to the distribution server 14 in accordance with the timing of reflecting the operation content, it is possible in the communication system 11 to distribute the combined moving image that has undergone the image processing according to the operation content at a timing when the designated time arrives.

Furthermore, the communication system 11 is capable of determining the operation content to be reflected in accordance with a predetermined method in a case where a plurality of users has preregistered the operation content at a same timing.

A method of determining the operation content to be reflected will be described with reference to FIG. 19.

Figure 19:
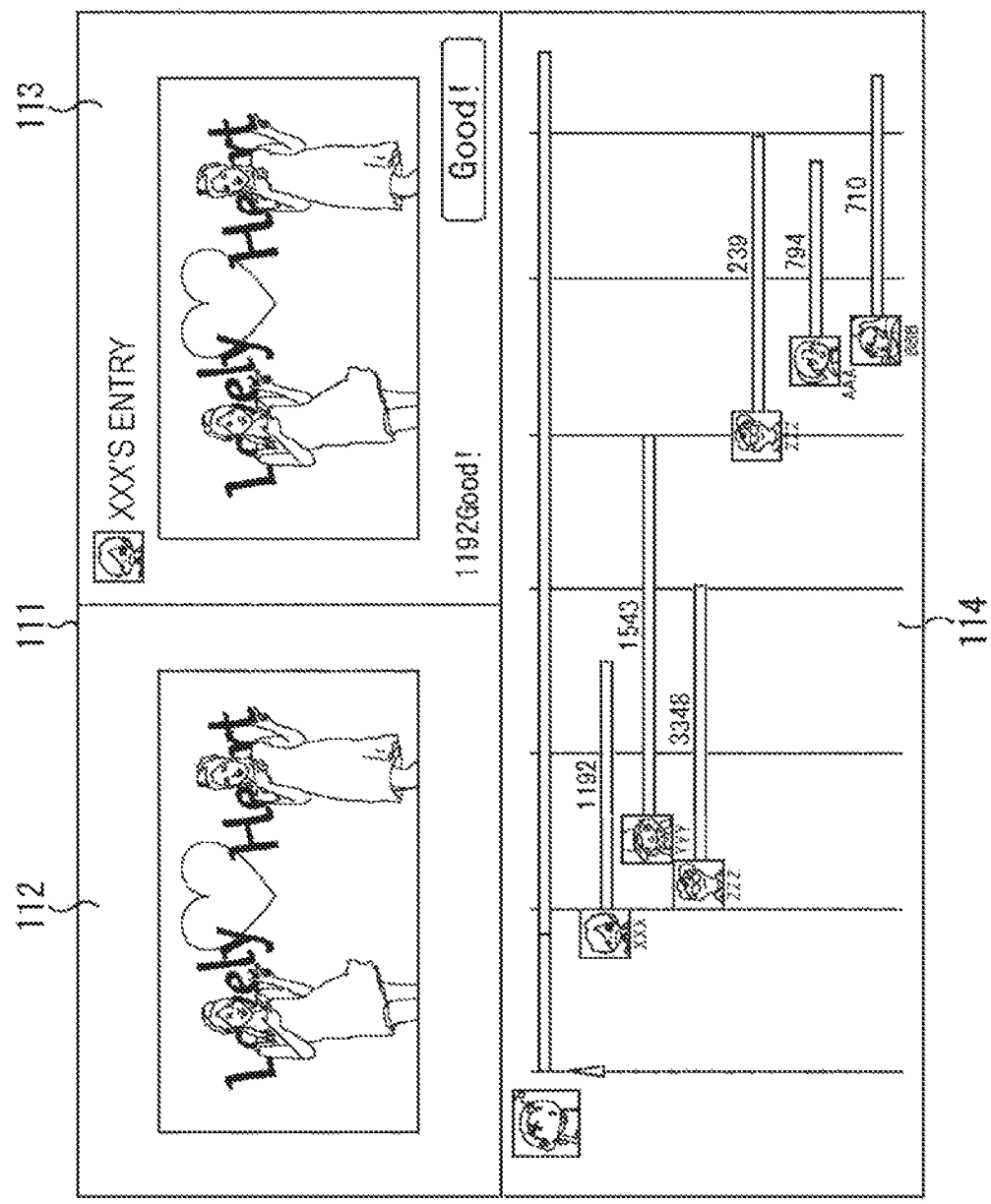
FIG. 19 is a view for describing a method of determining operation content to be reflected.

An operation content determination screen 111 illustrated in FIG. 19 is used in a method of determining operation content to be reflected by viewer's voting for operation content preregistered by a large number of users. As illustrated in the figure, the operation content determination screen 111 includes a preview window 112, a trial view window 113, and an entry window 114.

The preview window 112 displays a current frame of the combined moving image distributed from the distribution server 14.

The trial view window 113 displays a combined moving image when a certain user views, on a trial basis, the combined moving image reflecting the preregistered operation content. Then, in a case of voting for the operation content after viewing, on a trial basis, the moving image in which the operation content has been reflected, operation is performed on a good button arranged in the trial view window 113.

The entry window 114 displays operation content preregistered by various users using bands for individual time axes. Then, by touching the band displayed in the entry window 114, the combined moving image in which the operation content has been reflected is displayed in the trial view window 113.

Note that while the operation content determination screen 111 illustrated in FIG. 19 describes an exemplary case of collectively voting operation on all layers of a combined moving image, it is also possible to vote for each of the layers, such as a background layer and a person layer. For example, the voting method can be selected when a distributor of a moving image starts distribution. In this case, the entry window 114 displays, for each of layers, bands of operation content preregistered for each of the layers. Then, voting is performed for each of the layers, and in a case where the most voted items are the operation content preregistered by different users between the background layer and the person layer, for example, the most voted items are employed in combination with each other.

Note that the method of determining the preregistered operation content is not limited to the method of determining by this type of voting. For example, in a case where materials that can be selected as options (heart, sparkle, musical notes, etc.) are used, the operation content may be determined by a method adopting operation content in which those materials are used most frequently. Alternatively, the operation content may be determined by selection of a certain user by a method in which the user (for example, distributor of the moving image) has the authority of decision.

Furthermore, while in the above-described present embodiment, processing of combining all the user-clipped moving images transmitted from the information processing apparatuses 13-1 to 13-3 in the distribution server 14 has been described, it is also possible, for example, to combine a user-clipped moving image transmitted from at least one information processing apparatus 13 with the background moving image and distribute the combined image. Furthermore, it is also possible to combine a virtual object generated by computer graphics instead of an object clipped from the captured moving image, with one user-clipped moving image.

Note that the processing described with reference to the above-described flowcharts need not necessarily be processed in chronological order described as a flowchart, and may include processing executed in parallel or individually (e.g., parallel processing or processing by object). Moreover, the program may be processed by one CPU, or may be processed distributively by a plurality of CPUs.

Moreover, the above-described series of processing (information processing method) can be executed by hardware or by software. In a case where the series of processing is executed by software, a program constituting the software is installed from a program recording medium storing the program into a computer incorporated in dedicated hardware, or into a general-purpose computer, for example, capable of executing various functions by installing various programs.

Figure 20:
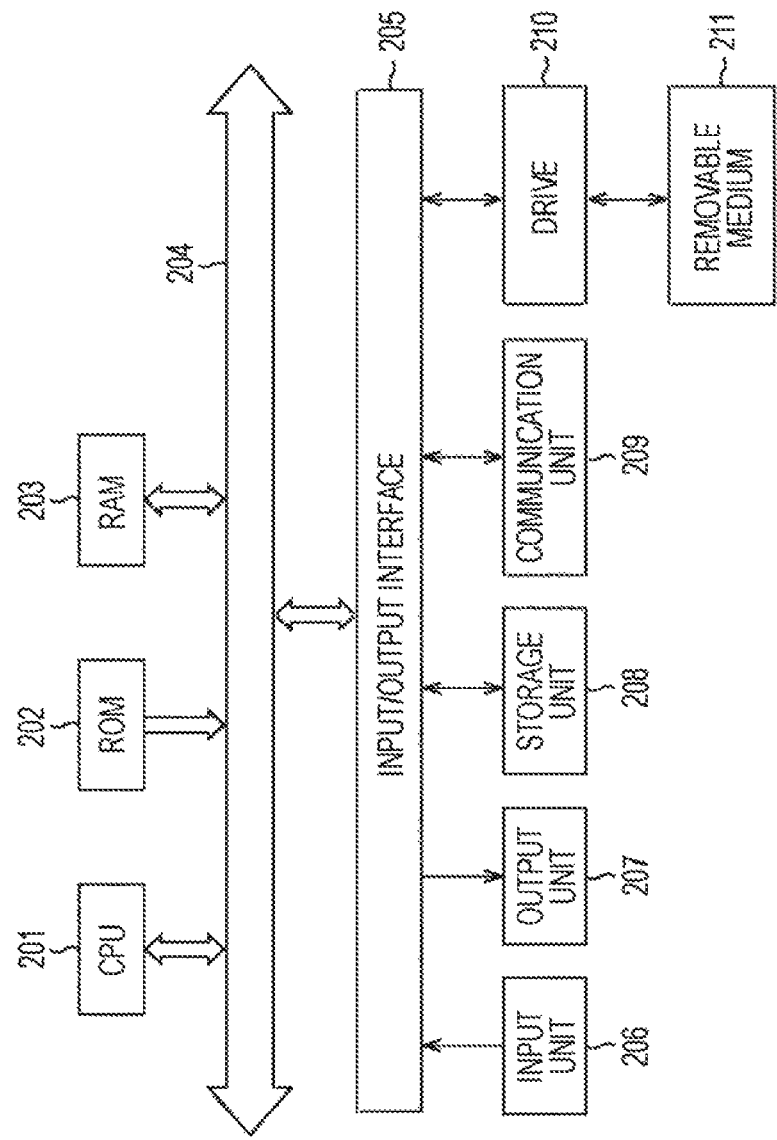
FIG. 20 is a block diagram illustrating an exemplary configuration of a computer according to an embodiment of the present technology.

FIG. 20 is a block diagram illustrating an exemplary configuration of hardware of a computer in which the series of processing described above is executed by a program.

In the computer, a central processing unit (CPU) 201, a read only memory (ROM) 202, and a random access memory (RAM) 203 are interconnected with each other via a bus 204.

The bus 204 is further connected with an input/output interface 205. The input/output interface 205 is connected with an input unit 206 including a keyboard, a mouse, a microphone and the like, an output unit 207 including a display, a speaker and the like, a storage unit 208 including a hard disk, a nonvolatile memory and the like, a communication unit 209 including a network interface and the like, and a drive 210 configured to drive a removable medium 211 such as a magnetic disk, an optical disk, a magneto-optical disk, and a semiconductor memory.

In the computer configured as above, the series of above-described processing is executed by operation in which the CPU 201 loads, for example, a program stored in the storage unit 208 onto the RAM 203 via the input/output interface 205 and the bus 204 and executes the program.

The program executed by the computer (CPU 201) is, for example, provided as a program recorded on the removable medium 211 which is a package medium such as a magnetic disk (including a flexible disk), an optical disk (including a compact disc-read only memory (CD-ROM) and a digital versatile disc (DVD)), a magneto-optical disk, or a semiconductor memory, or provided via a wired or wireless transmission medium such as a local area network, the Internet, and digital satellite broadcast.

Then, the program can be installed in the storage unit 208 via the input/output interface 205, by attaching the removable medium 211 to the drive 210. In this case, the program can be received at the communication unit 209 via a wired or wireless transmission medium and be installed in the storage unit 208. Alternatively, the program can be installed in the ROM 202 or the storage unit 208 beforehand.

Note that the present technology may also be configured as follows.

(1)

An image processing system including:

an image processing unit configured to perform, individually for each of objects, image processing on an object moving image generated from a moving image in which a predetermined object is imaged and generated so as to include a region in which the object is photographed, the image processing corresponding to operation content applied to the object moving image; and a combined image generation processing unit configured to generate a combined moving image including at least one of the objects by combining the object moving image that has undergone image processing with another moving image.

(2)

The image processing system according to (1), further including:

an individual image recording unit configured to record the object moving image for each of the plurality of objects; and an operation recording unit configured to record the operation content for each of the plurality of objects every time operation is performed on the object moving image, in which the image processing unit reflects latest operation content recorded in the operation recording unit on the object moving image recorded in the individual image recording unit.

(3)

The image processing system according to (1) or (2), further including:

a distance measurement unit configured to measure a distance to the object photographed in the moving image; and a clipped image processing unit configured to perform image processing of clipping a predetermined object from the moving image in which the predetermined object is imaged on the basis of the distance to the object measured by the distance measurement unit.

(4)

The image processing system according to (3), in which the distance measurement unit adds likelihood information indicating probability of a calculation result being correct to the object moving image in units of pixels constituting the moving image when calculating the distance to the object, and the image processing unit performs image processing of deleting an unnecessary region with reference to the likelihood information in a case where operation of deleting the unnecessary region is performed on a state in which the unnecessary region to be naturally deleted by the clipped image processing unit remains.

(5)

The image processing system according to (4), in which the image processing unit performs image processing of deleting the unnecessary region in accordance with a relative position and a relative size from one region portion as a center that is automatically detectable among the object moving image.

(6)

The image processing system according to (4) or (5), in which the image processing unit performs image processing of deleting the unnecessary region fixedly appearing in the moving image to be a target of generating the object moving image, in accordance with a position set on the basis of the moving image.

(7)

The image processing system according to any of (1) to (6), in which the image processing unit performs image processing of trimming the object moving image on the basis of a position at which the relative trimming is performed relative to a reference position set as a reference of the trimming as a center and size thereof, in accordance with the operation content of performing trimming on the object moving image.

(8)

The image processing system according to any of (1) to (7), in which the image processing unit performs image processing corresponding to the operation content applied to the object moving image, using a transformation parameter uniquely determined corresponding to the object moving image even in a case where the object moves.

(9)

The image processing system according to (8), in which the image processing unit performs image processing using the transformation parameter in accordance with the operation content of performing enlargement, reduction, translation, or rotation, on the object moving image.

(10)

The image processing system according to any of (1) to (9), in which preregistration is performed such that the operation content is reflected at a designated time, and the image processing unit performs image processing in accordance with the registered operation content on the object moving image at a timing when the designated time arrives.

(11)

The image processing system according to (10), in which, in a case where a plurality of items of the operation content is preregistered in advance so as to be reflected at a predetermined designated time, voting is performed on operation content to be actually reflected among the plurality of items of operation content, and the image processing unit performs image processing corresponding to the most voted operation content on the object moving image at the timing when the designated time arrives.

(12)

An image processing method including the steps of:

performing, individually for each of objects, image processing on an object moving image generated from a moving image in which a predetermined object is imaged and generated so as to include a region in which the object is photographed, the image processing corresponding to operation content applied to the object moving image; and generating a combined moving image including at least one of the objects by combining the object moving image that has undergone image processing with another moving image.

(13)

A program for causing a computer to execute image processing including the steps of:

performing, individually for each of objects, image processing on an object moving image generated from a moving image in which a predetermined object is imaged and generated so as to include a region in which the object is photographed, the image processing corresponding to operation content applied to the object moving image; and generating a combined moving image including at least one of the objects by combining the object moving image that has undergone image processing with another moving image.

Note that the present embodiment is not limited to the above-described embodiments but can be modified in a variety of ways within a scope of the present disclosure.

REFERENCE SIGNS LIST

11 Communication system
12 Network
13-1 to 13-3 Information processing apparatus
14 Distribution server
21 Digital signal processing unit
22 Distance measurement unit
23 Clipped image generation unit
24 Communication unit
25 Display unit
26 Operation unit
31 Communication unit
32 User management unit
33-1 to 33-3 User individual processing unit
34 Background recording unit
35 Overall image combining unit
41-1 to 41-3 Individual image recording unit
42-1 to 42-3 Operation recording unit
43-1 to 43-3 Image processing unit
51 Image transmission apparatus
52 User interface apparatus

The invention claimed is:

1. An image processing system, comprising:
at least one processor configured to:
receive a first object moving image from a first imaging device of a plurality of imaging devices and a second object moving image from a second imaging device of the plurality of imaging devices, wherein
the first imaging device:
calculates a distance from the first imaging device to a first specific object captured in a first moving image, wherein the first moving image is captured by the first imaging device;
executes a clipping operation corresponding to an image processing such that the first specific object is clipped from the first moving image, wherein the clipping operation is executed based on the calculated distance;
generates the first object moving image based on the execution of the clipping operation;
adds likelihood information to the first object moving image based on the calculation of the distance to the first specific object, wherein
the likelihood information indicates a probability of a calculation result being correct,
the calculation result is associated with the calculation of the distance to the first specific object, and
the likelihood information is in units of pixels constituting the first moving image; and
executes a deletion operation corresponding to the image processing such that an unnecessary region in the first object moving image is deleted based on the likelihood information,
the second imaging device generates the second object moving image from a second moving image,
the second moving image includes a second specific object,
the first object moving image includes a first region in which the first specific object is captured, and
the second object moving image includes a second region in which the second specific object is captured;
execute the image processing on each of the first object moving image and the second object moving image, wherein the image processing corresponds to each of addition of first operation content to the first object moving image and addition of second operation content to the second object moving image;
generate a first combined moving image based on a combination of the first object moving image and the second object moving image with a specific moving image, and the execution of the image processing,
wherein the generated first combined moving image includes the specific moving image as a background image, the first object moving image, and the second object moving image;
control each of a first display unit of the first imaging device and a second display unit of the second imaging device to display the generated first combined moving image;
receive a user input from the first imaging device, wherein the user input indicates a plurality of depth coordinates of the first object moving image in the displayed first combined moving image;
generate a second combined moving image based on the plurality of depth coordinates; and
control the first display unit to display the generated second combined moving image.

2. The image processing system according to claim 1, wherein the at least one processor is further configured to:
record the first object moving image for the first specific object;
record the first operation content for the first specific object based on execution of an operation on the first object moving image; and
update the first object moving image based on the recorded first operation content.

3. The image processing system according to claim 1, wherein
the execution of the deletion operation is further based on a specific position and a specific size of the unnecessary region, and
the unnecessary region corresponds to a center of the first object moving image, which is automatically detectable from the first object moving image.

4. The image processing system according to claim 1, wherein
the unnecessary region is in a specific region of the first moving image, and
the specific region of the first moving image is a target region that corresponds to the first object moving image.

5. The image processing system according to claim 1, wherein
the at least one processor is further configured to execute a trimming operation corresponding to the image processing such that the first object moving image is trimmed from a specific position of the first object moving image,
the trimming operation is executed based on the first operation content,
the first operation content indicates the specific position, and
the specific position corresponds to each of a center and a size of the first object moving image.

6. The image processing system according to claim 1, wherein the at least one processor is further configured to execute the image processing based on a transformation parameter corresponding to the first object moving image.

7. The image processing system according to claim 6, wherein
the at least one processor is further configured to execute at least one of an enlargement operation, a reduction operation, a translation operation, or a rotation operation based on the transformation parameter and the first operation content of the first object moving image, and
each of the enlargement operation, the reduction operation, the translation operation, and the rotation operation corresponds to the image processing on the first object moving image.

8. The image processing system according to claim 1, wherein the at least one processor is further configured to:
execute a preregistration operation such that the first operation content is added to the first object moving image at a designated time; and
execute the image processing on the first object moving image based on the first operation content, wherein the image processing is executed at the designated time.

9. The image processing system according to claim 8, wherein
the first operation content includes a plurality of items added to the first object moving image at the designated time, and
the at least one processor is further configured to:
execute a voting operation on the plurality of items of the first operation content; and
execute the image processing on the first object moving image based on the voting operation, wherein the image processing is executed at the designated time.

10. An image processing method, comprising:
receiving a first object moving image from a first imaging device of a plurality of imaging devices and a second object moving image from a second imaging device of the plurality of imaging devices, wherein
the first imaging device:
calculates a distance from the first imaging device to a first specific object captured in a first moving image, wherein the first moving image is captured by the first imaging device;
executes a clipping operation corresponding to an image processing such that the first specific object is clipped from the first moving image, wherein the clipping operation is executed based on the calculated distance;
generates the first object moving image based on the execution of the clipping operation;
adds likelihood information to the first object moving image based on the calculation of the distance to the first specific object, wherein
the likelihood information indicates a probability of a calculation result being correct,
the calculation result is associated with the calculation of the distance to the first specific object, and
the likelihood information is in units of pixels constituting the first moving image; and
executes a deletion operation corresponding to the image processing such that an unnecessary region in the first object moving image is deleted based on the likelihood information,
the second imaging device generates the second object moving image from a second moving image,
the second moving image includes a second specific object,
the first object moving image includes a first region in which the first specific object is captured, and
the second object moving image includes a second region in which the second specific object is captured;
executing the image processing on each of the first object moving image and the second object moving image, wherein the image processing corresponds to each of addition of first operation content to the first object moving image and addition of second operation content to the second object moving image;

generating a first combined moving image based on a combination of the first object moving image and the second object moving image with a specific moving image, and the execution of the image processing, wherein the generated first combined moving image includes the specific moving image as a background image, the first object moving image, and the second object moving image;

controlling each of a first display unit of the first imaging device and a second display unit of the second imaging device to display the generated first combined moving image;

receiving a user input from the first imaging device, wherein the user input indicates a plurality of depth coordinates of the first object moving image in the displayed first combined moving image;

generating a second combined moving image based on the plurality of depth coordinates; and controlling the first display unit to display the generated second combined moving image.

11. A non-transitory computer-readable medium having stored thereon computer-readable instructions, which when executed by a computer, cause the computer to execute operations, the operations comprising:

receiving a first object moving image from a first imaging device of a plurality of imaging devices and a second object moving image from a second imaging device of the plurality of imaging devices, wherein the first imaging device:

calculates a distance from the first imaging device to a first specific object captured in a first moving image, wherein the first moving image is captured by the first imaging device;

executes a clipping operation corresponding to an image processing such that the first specific object is clipped from the first moving image, wherein the clipping operation is executed based on the calculated distance;

generates the first object moving image based on the execution of the clipping operation;

adds likelihood information to the first object moving image based on the calculation of the distance to the first specific object, wherein the likelihood information indicates a probability of a calculation result being correct, the calculation result is associated with the calculation of the distance to the first specific object, and the likelihood information is in units of pixels constituting the first moving image; and executes a deletion operation corresponding to the image processing such that an unnecessary region in the first object moving image is deleted based on the likelihood information, the second imaging device generates the second object moving image from a second moving image, the second moving image includes a second specific object, the first object moving image includes a first region in which the first specific object is captured, and the second object moving image includes a second region in which the second specific object is captured;

executing the image processing on each of the first object moving image and the second object moving image, wherein the image processing corresponds to each of addition of first operation content to the first object moving image and addition of second operation content to the second object moving image;

generating a first combined moving image based on a combination of the first object moving image and the second object moving image with a specific moving image, and the execution of the image processing, wherein the generated first combined moving image includes the specific moving image as a background image, the first object moving image, and the second object moving image;

controlling each of a first display unit of the first imaging device and a second display unit of the second imaging device to display the generated first combined moving image;

receiving a user input from the first imaging device, wherein the user input indicates a plurality of depth coordinates of the first object moving image in the displayed first combined moving image;

generating a second combined moving image based on the plurality of depth coordinates; and controlling the first display unit to display the generated second combined moving image.

* * * * *